US008310729B2

(12) United States Patent
Aoyagi

(10) Patent No.: US 8,310,729 B2
(45) Date of Patent: Nov. 13, 2012

(54) DEVICE CAPABLE OF ADJUSTING TWO-DIMENSIONAL CODE

(75) Inventor: Takeshi Aoyagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/345,846

(22) Filed: Jan. 9, 2012

(65) Prior Publication Data
US 2012/0113438 A1    May 10, 2012

Related U.S. Application Data

(62) Division of application No. 12/174,939, filed on Jul. 17, 2008, now Pat. No. 8,125,690.

(30) Foreign Application Priority Data

Jul. 25, 2007 (JP) .................................. 2007-193739

(51) Int. Cl.
H04N 1/40 (2006.01)
(52) U.S. Cl. ........ 358/3.28; 358/3.12; 358/1.9; 345/629
(58) Field of Classification Search ................. 358/3.28, 358/3.12, 1.9; 345/629
See application file for complete search history.

(56) References Cited

U.S. PATENT DOCUMENTS

| | | | |
|---|---|---|---|
| 5,398,108 A | 3/1995 | Morinaga et al. | |
| 5,933,520 A | 8/1999 | Ishimoto et al. | |
| 6,714,676 B2 | 3/2004 | Yamagata et al. | |
| 7,339,599 B2 | 3/2008 | Hayashi | |
| 2004/0150859 A1 | 8/2004 | Hayashi | |
| 2005/0013505 A1 | 1/2005 | Nishimura et al. | |
| 2007/0057074 A1 | 3/2007 | Cheung et al. | |
| 2007/0236741 A1* | 10/2007 | Tai et al. ...................... | 358/3.12 |

FOREIGN PATENT DOCUMENTS

| | | |
|---|---|---|
| JP | 2003-280469 | 10/2003 |
| JP | 2004-112356 A | 4/2004 |
| JP | 2004-223854 A | 8/2004 |
| JP | 2004-228896 | 8/2004 |
| JP | 2007-151082 A | 6/2007 |

OTHER PUBLICATIONS

Office Action in corresponding Japanese Application No. 2007-193739 dated Jul. 22, 2011.
Japanese Office Action dated May 29, 2012, issued by the Japanese Patent Office, in Japanese Patent Application No. 2011-214709.

* cited by examiner

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

An image forming device is provided which embeds a decodable two-dimensional code when embedding (printing) a two-dimensional code in an original document. The image forming device represents additional information by associating virtual points with dots in one-to-one correspondence and arranges dots in positions deviated from virtual points associated with the dots. The image forming device includes a determining unit for determining intervals between the virtual points and virtual points adjacent to the virtual points and determining sizes of the dots, and an arranging unit for arranging dots having the determined sizes to respective virtual points having the determined intervals. The determining unit may determine dots to have sizes other than sizes proportional to the determined intervals.

9 Claims, 35 Drawing Sheets

| GRID INTERVAL | 4mm | 2mm | 1mm | 0.5mm |
|---|---|---|---|---|
| NUMBER OF EMBEDDED DOTS PER UNIT AREA (1600 mm²) | 100dot | 400dot | 1600dot | 6400dot |
| DOT AREA 1μm² | 100 | 400 | 1600 | 6400 |
| 2μm² | 200 | 800 | 3200 | 12800 |
| 4μm² | 400 | 1600 | 6400 | 25600 |
| 6μm² | 600 | 2400 | 9600 | 38400 |

DECODABLE | UNDECODABLE

FIG.5

| DOT AREA | GRID INTERVAL | 4 mm | 2 mm | 1 mm | 0.5 mm |
|---|---|---|---|---|---|
| | 1 μm² | | | ADJUSTMENT LEVEL 1 | ADJUSTMENT LEVEL 2 |
| | 2 μm² | | ADJUSTMENT LEVEL 0 | | |
| | 4 μm² | | | ADJUSTMENT LEVEL 3 | ADJUSTMENT LEVEL 4 |
| | 6 μm² | | | | |

FIG.11

| GRID INTERVAL | 4mm | 2mm | 1mm | 0.5mm |
|---|---|---|---|---|
| DOT AREA | | | | |
| 1 μm² | | | ADJUSTMENT LEVEL 0 | ADJUSTMENT LEVEL 1 |
| 2 μm² | | | | ADJUSTMENT LEVEL 2 |
| 4 μm² | | | | ADJUSTMENT LEVEL 3·4 |
| 6 μm² | | | | |

FIG.12

| REGION | OBJECT | ANALYZING SPEED | DATA SIZE |
|---|---|---|---|
| FIRST REGION | INFORMATION DETECTED IN REAL TIME | SAME DEGREE OF SPEED AS SCANNING SPEED | SMALL SIZE |
| SECOND REGION | INFORMATION DETECTED IN NON-REAL TIME | RELATIVELY LOW SPEED | LARGE SIZE |

DEVICE CAPABLE OF ADJUSTING TWO-DIMENSIONAL CODE

This application is a divisional of U.S. patent application Ser. No. 12/174,939, filed on Jul. 17, 2008, and allowed on Nov. 30, 2011.

BACKGROUND OF THE INVENTION

1. Field of the Invention

The present invention relates to a device embedding a two-dimensional code in an original document using a low-visibility information embedding method, and in particular to a device having a function of adjusting a two-dimensional code before embedding (printing) the two-dimensional code in an original document.

2. Description of the Related Art

In recent years, there has frequently occurred an incident where confidential information, such as customer information held by a company, illegally flows out of the company, which has become a big social problem. In order to prevent such an incident from occurring, many companies take countermeasures to prevent confidential information from flowing out of the companies, such as imposing an access restriction on confidential information converted to electronic form and providing a monitor for a firewall. In addition, some companies take actions such as prohibiting employees from bringing a private portable memory such as a notebook PC or a USB memory into the companies and prohibiting employees from taking information equipment possessed by the companies out of the companies without permission. In this way, companies plan to protect confidential information converted to electronic form by taking various security measures. On the other hand, an employee generally can take a document out of the company, so that when confidential information is printed on paper as part of a document, it is difficult to prevent the document from being illegally taken out of the company. A document which has been illegally taken out of a company may be copied or converted to electronic form using a scanner to make many copies of the document and the copies may be distributed to the general public. It is therefore necessary for companies to take measures to protect confidential information printed in a paper document in addition to strengthening the management of confidential information converted to electronic form, in order to ensure the protection and management of confidential information.

In order to protect confidential information printed in a paper document, various methods have been previously proposed. As one of the methods, a method exists for printing an image and embedding printing/coping history information in an original document in the form of a two-dimensional code when printing the image, using a technology of embedding/extracting information with a two-dimensional code. According to this method, a confidential information manager is able to identify a person who took out a document or a person who took a copy of the document by getting the document or a copy of it and analyzing a two-dimensional code embedded therein. It can be considered that this serves as a big deterrent against bringing out a document in which confidential information is printed and copying the document. Furthermore, as another method, a method exists for printing an image and embedding copy restriction information (copy permission, copy prohibition, or the like) in an original document in the form of a two-dimensional code when printing the image, using a technology of embedding/extracting information with a two-dimensional code (Japanese Patent Laid-Open No. 2003-280469). According to this method, a copying machine having a function using the technology of embedding/extracting information is able to extract the two-dimensional code from the original document, analyze it to obtain copy restriction information, and control the continuation or stop of copying every page on the basis of the copy restriction information when copying the original document. Furthermore, the copying machine is able to control copying so that only an authorized user is able to make a copy by embedding the user information or password information of a person who has been admitted to make a copy.

In this way, the methods described above include a step of embedding additional information (printing/copying history information, copy restriction information, and the like) in an original document in the form of a two-dimensional code, and a step of extracting the two-dimensional code embedded in the original document and analyzing it.

The method of embedding additional information in an original document in the form of a two-dimensional code might not be able to accurately extract the two-dimensional code from the original document or accurately analyze the extracted two-dimensional code from the reasons given below.

- A two-dimensional code is not accurately embedded in an original document due to the condition of deposition of toner at the time of embedding the two-dimensional code in the original document (at the time of printing the two-dimensional code) or due to a method of handling the original document.
- A two-dimensional barcode can not be accurately extracted by the restriction of the scanning accuracy of a scanner scanning an original document in which the two-dimensional code is embedded.
- When a portion on which a two-dimensional code and an image are printed overlapping each other exists, the two-dimensional code can not be accurately extracted from the portion.

In this way, in the conventional methods, it is determined whether a two-dimensional code embedded in an original document is appropriate or not for the first time at a step of extracting the two-dimensional code embedded in the original document and analyzing it. In other words, the conventional methods have a problem that it can not be determined at a step of embedding a two-dimensional code whether a printout result effective for security has been obtained, that is, whether an appropriate two-dimensional code has been embedded.

SUMMARY OF THE INVENTION

An object of the present invention is to provide a device which generates a decodable two-dimensional code by adjusting a two-dimensional code before embedding the two-dimensional code in an original document and embeds the decodable two-dimensional code in the original document.

An image forming device of the present invention represents additional information by associating virtual points with dots in one-to-one correspondence and arranges dots in positions deviated from virtual points associated with the dots. The image forming device includes a determining unit configured to determine intervals between the virtual points and virtual points adjacent to the virtual points and determine sizes of the dots, and an arranging unit configured to arrange dots having the determined sizes to respective virtual points having the determined intervals. The determining unit may determine the dots to have sizes other than sizes proportional to the determined intervals.

A method of the present invention includes representing additional information by associating virtual points with dots in one-to-one correspondence and by arranging dots in positions deviated from virtual points associated with the dots. The method includes a determining step of determining intervals between the virtual points and virtual points adjacent to the virtual points and determining sizes of the dots, and an arranging step of arranging dots having the determined sizes to virtual points having the determined intervals. The determining step may include determining the dots to have sizes other than sizes proportional to the determined intervals.

A device of the present invention arranges dot groups in positions corresponding to additional information which is represented on the basis of positions of dots included in the arranged dot groups and virtual points associated with the respective dots. The device may change sizes of the respective dots while fixing intervals between the virtual points and virtual points adjacent to the virtual points.

According to the present invention, a decodable two-dimensional code can be embedded when a two-dimensional code is embedded (printed) in an original document, because a decodable two-dimensional code can be generated by adjusting a two-dimensional code before embedding the two-dimensional code in an original document.

Further features of the present invention will become apparent from the following description of exemplary embodiments (with reference to the attached drawings).

BRIEF DESCRIPTION OF THE DRAWINGS

FIG. 5 is a diagram showing relations among grid intervals, dot areas, whether LVBCs are decodable or not, and amounts of dots embedded;

FIG. 11 is a diagram illustrating an example of adjusting a grid interval and a dot area based on adjustment levels in the third embodiment;

FIG. 12 is a diagram illustrating another example of adjusting a grid interval and a dot area based on adjustment levels in the third embodiment;

FIG. 19 is a diagram showing the characteristic of information embedded in a first region and a second region;

DESCRIPTION OF THE EMBODIMENTS

In the embodiments, a low visibility barcode (LVBC) is used as a two-dimensional code. For this reason, information embedding and extracting technologies using a LVBC will be described in detail first.

(LVBC)

In the embodiments, a printer prints desired additional information (referred to as embedded information hereinafter) with an original document image on a sheet such as a paper or an OHP sheet.

Generally, requirements for embedding information are as follows.

Capability of embedding information to be embedded having a sufficient amount of information on a sheet Capability of extracting the embedded information embedded using color material (toner, ink, etc.) on a sheet afterward without fail as digital information.

Durability against factors disturbing the extraction of the embedded information (rotation, expansion, compression or partial deletion of a document, signal deterioration by copying, dirt, or the like) in copying a document image onto a sheet.

Capability of extracting the embedded information in real-time or a similar speed in copying for preventing a document having embedded information indicating copy prohibition from being copied.

Figure 18:
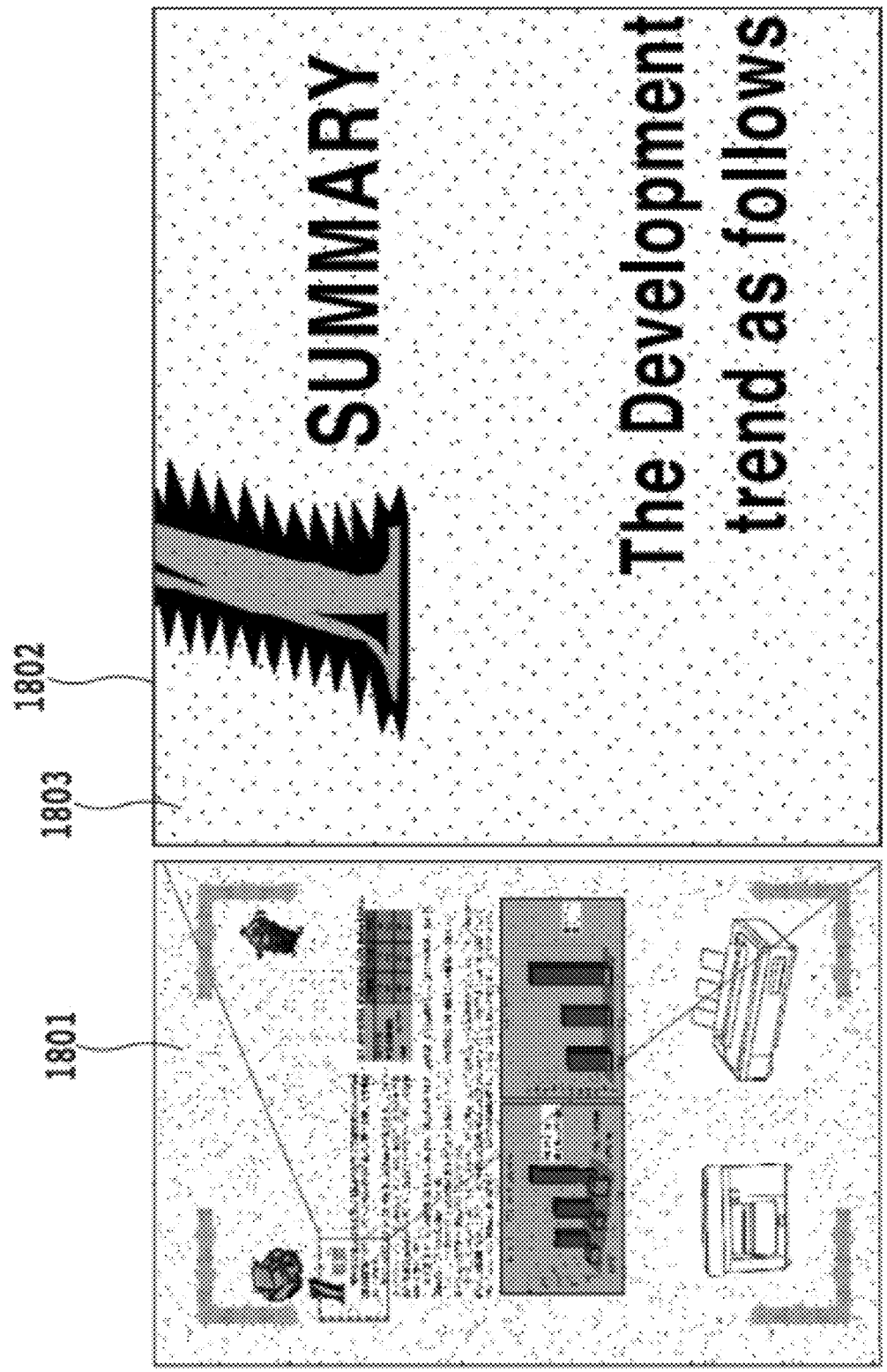
FIG. 18 is a diagram showing an example of an original document in which an LVBC is embedded.

FIG. 18 is a diagram illustrating an example of a document having the embedded LVBC.

Reference numeral 1801 shows an entire sheet and Reference numeral 1802 shows an enlarged diagram of the sheet shown by Reference numeral 1801. With reference to the drawing shown by Reference numeral 1802, many dots 1803 are printed on the sheet other than an image originally drawn on a document. In the information embedding technique using the LVBC, the information to be embedded is embedded in a sheet via these dots. (Two regions for embedding the information to be embedded)

Next, a region for embedding the information to be embedded will be described. The region is divided into a first region and a second region.

FIG. 19 is a diagram illustrating characteristics of the information to be embedded in the first region and the second region.

The information to be embedded is classified into two kinds of information to be embedded having different characteristics. The respective kinds of information to be embedded are embedded in the first region and the second region separately so as to be extracted individually.

In the first region, there is embedded information to be extracted in real-time by usual scanning in copy operation such as the location information of an electronic document to be printed, print parameter information (N-up printing, resolution, compression and decompression, etc.), security information and the like. The extraction processing of the information embedded in the first region is always performed and delay of the extraction of the embedded information affects the total copy speed. Accordingly, analyzing the embedded information requires a speed similar to the scan speed, for example. Meanwhile, such information may have a small amount of information and the data size thereof may be small.

In the second region, there is embedded search information. The search information is, for example, object coordinate information in a page or a keyword, and used for object search. The search information is not used in the usual copying and extraction of the search information does not affect the copy speed. The search information extraction is not necessarily carried out in real-time and therefore analysis speed of the search information may be comparatively slow. Accordingly, the search information can include a lot of information.

For the LVBC in the present embodiment, in order to deal with such embedded information having different characteristics, the information to be embedded is embedded in a region where the first region and the second region are mixed. Further, the present embodiment selects three types of extraction depending on applications: extraction only from the first region, extraction only from the second region, and extraction from both of the regions. When the embedded information is extracted only from the first region, the extraction is carried out in a speed not to affect productivity of the copy operation by improving the analysis speed.

Figure 20:
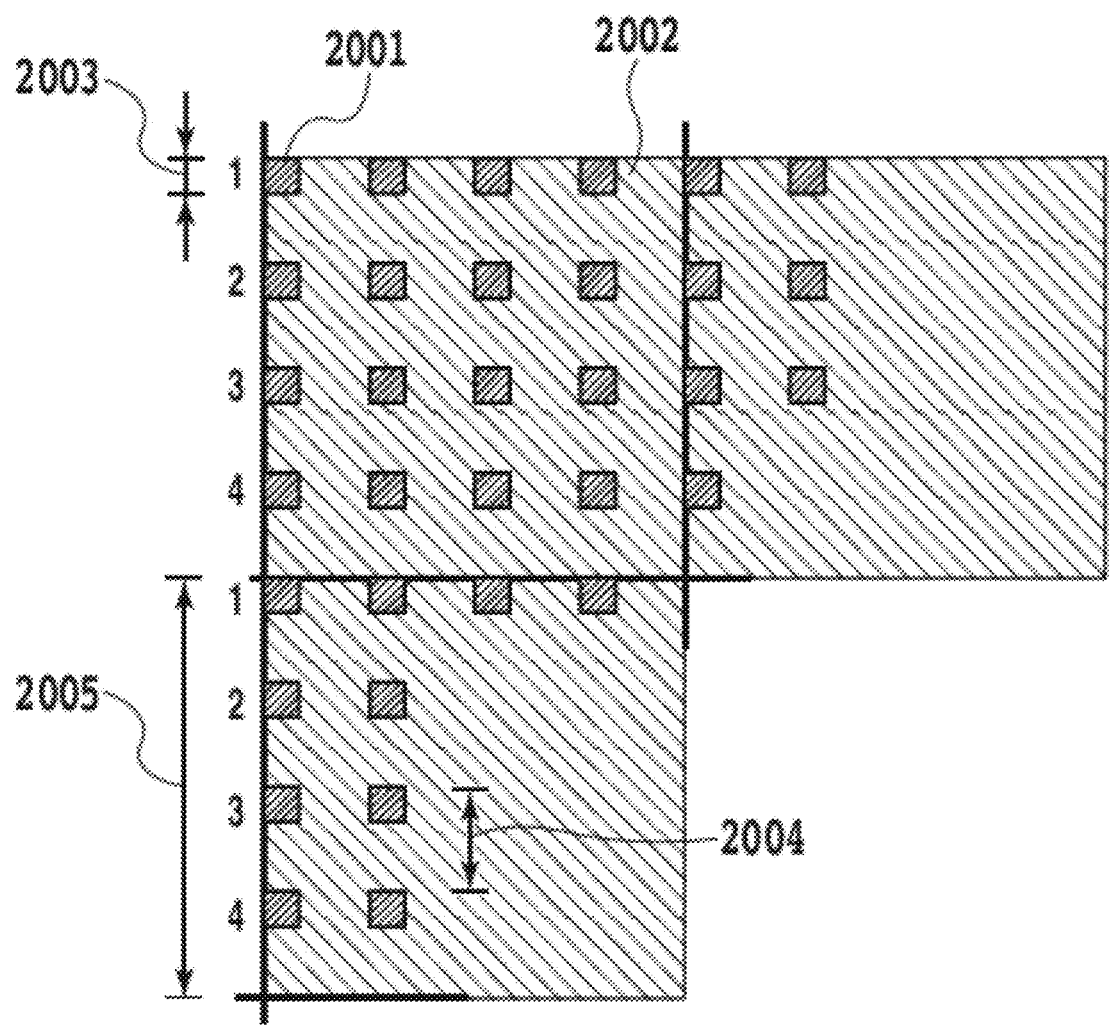
FIG. 20 is a diagram showing arrangement of first regions and second regions.

FIG. 20 is a diagram for illustrating arrangements of the first region and the second region.

A square region indicated by Reference numeral 2001 shows the first region. While a plurality of same square regions is arranged periodically, the same information to be embedded is stored in each of the regions. By embedding the same information in the plurality of first regions in this manner, it is possible to improve redundancy of the embedded information and thereby to strengthen durability of the embedded information against noise or errors. Reference numeral 2003 and Reference numeral 2004 indicate a first region size and a first region repetition period, respectively.

A square indicated by Reference numeral 2002 shows the second region. The second region has a plurality of periodically arranged same square regions similarly to the first region. The above described two particular different kinds of information are embedded in the first region 2001 and the second region exclusively. Reference numeral 2005 indicates a second region size.

(LVBC Embedding Method)

Next, an embedding method of the LVBC will be described.

In an information embedding method using the LVBC, a virtual grid is used.

The information to be embedded is binary data within a certain size. The information to be embedded is embedded on a sheet as information by displacing a dot upward, downward, rightward, or leftward into any of eight directions from a grid point (shift disposition from a grid point).

Figure 21:
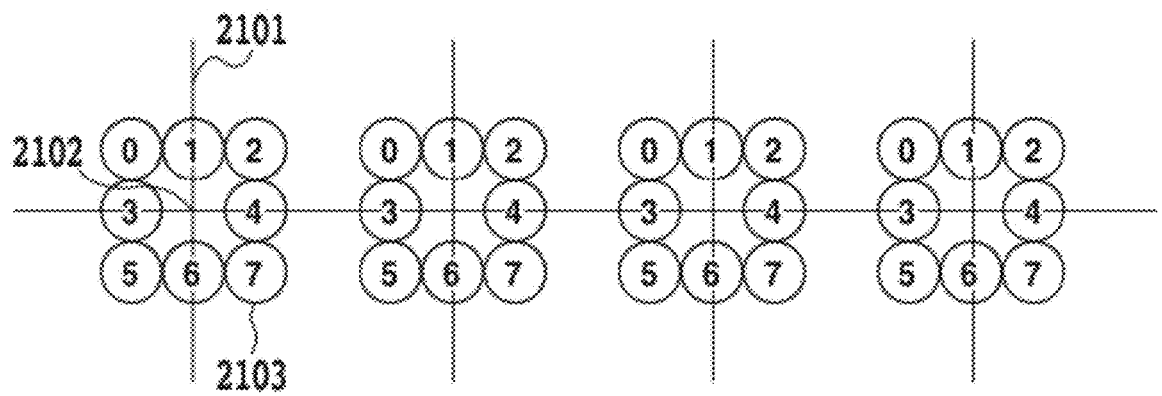
FIG. 21 is a diagram showing the positional relations between grids and places where dots are arranged.

FIG. 21 is a diagram illustrating a positional relationship between the grid point and the dot disposition position.

In FIG. 21, vertical and horizontal lines 2101 show the grid. Reference numeral 2102 indicates a grid point. The dot is not disposed at the grid point 2102. For example, the dot is disposed at a position apart from the grid point 2102 in the lower right direction.

Figure 22:
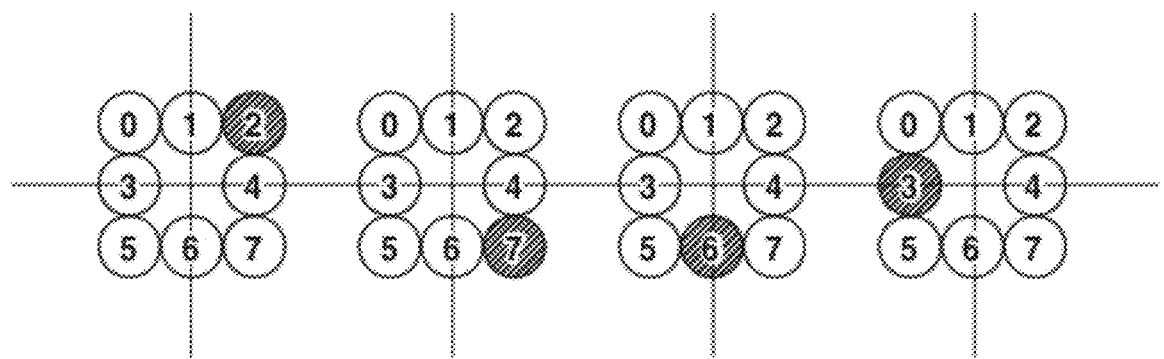
FIG. 22 is a diagram showing an example of the binary data of 010111110011 embedded as embedded information.

FIG. 22 is a diagram illustrating an example in which binary data of 010111110011 is embedded for the information to be embedded.

When the binary data of 010111110011 is embedded, the binary data is divided into three-bit units such as 010, 111, 110, and 011. Then, each of the three-bit units is converted from a binary number to a decimal number to obtain 2, 7, 6, and 3.

The information to be embedded is embedded by displacing each dot upward, downward, rightward, or leftward, into any of the eight directions from the grid point, according to the number expressing the information to be embedded. For example, when 2, 7, 6, and 3 are embedded as the information to be embedded, respective dots are displaced to the upper right, lower right, lower, and left. In FIG. 22, black circles indicate the dots. In the information embedding method using the LVBC, by repeating the above described embedding, it is possible to embed the information to be embedded having a information amount of about 2,000 Bytes into a sheet. Further, by embedding these dots representing the embedded information over the entire sheet, it is possible to improve the redundancy of the embedded information and to strengthen the durability against dirt on a sheet, and wrinkles and partial destruction of a sheet.

For analyzing the LVBC, first, a position of the grid needs to be detected accurately. Accordingly, it is preferable to make the dots representing the embedded information appear in the eight directions from the grid point with the same probability. However, when a particular value such as zero are frequently embedded as the information to be embedded, the dots representing the embedded information may not appear in the eight directions with the same probability. Accordingly, in the information embedding method using the LVBC, the information to be embedded is provided with scramble processing (e.g., common key cryptographic processing) having reversibility for the embedded information to obtain random dot displacements.

The information embedding method using the LVBC is considered to be a DA conversion which records digital data of the information to be embedded on a sheet as analog data, and can be realized by a relatively simple configuration.

(LVBC Analyzing Method)

Next, a LVBC analyzing method will be described.

Figure 23:
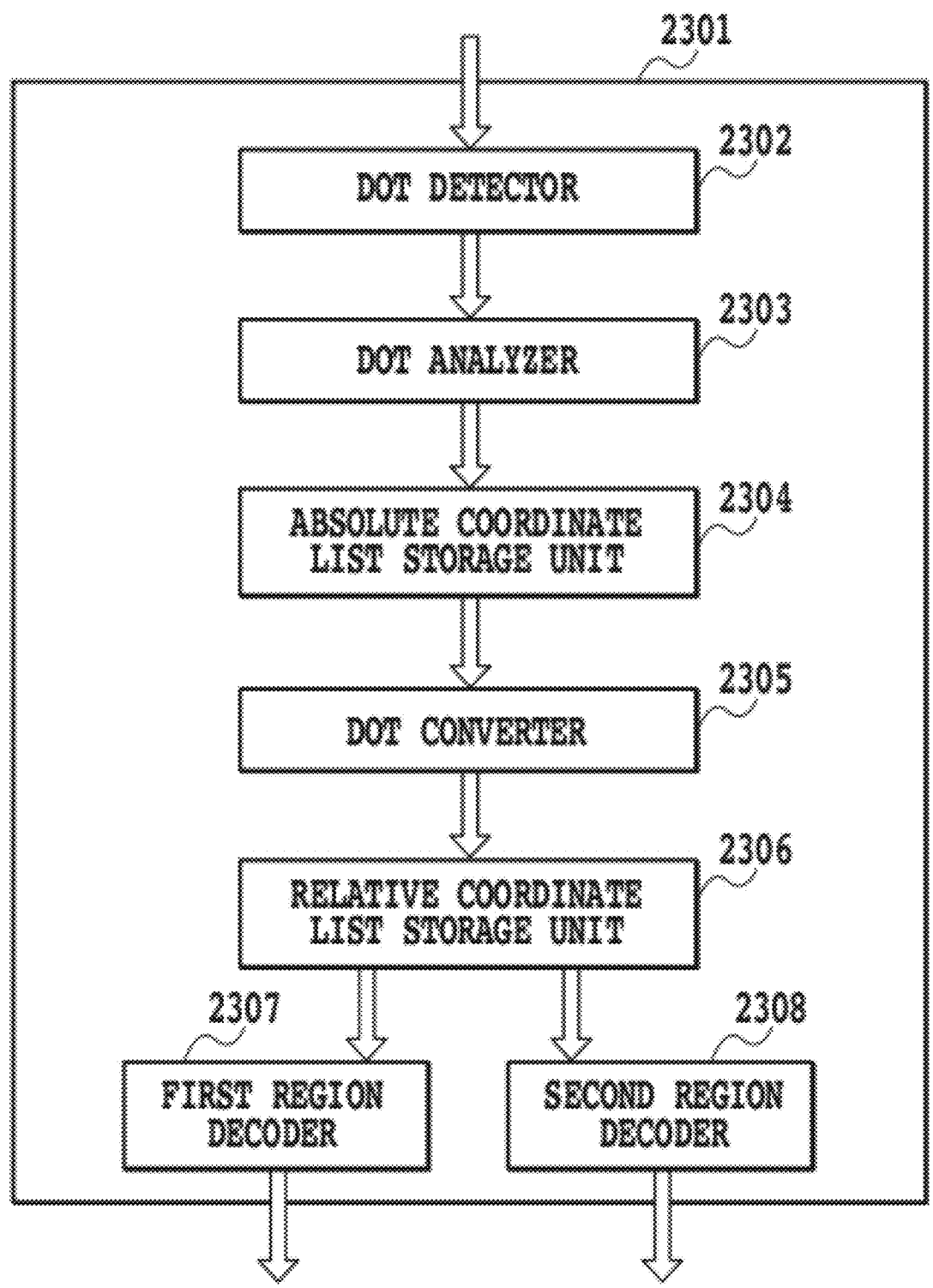
FIG. 23 is a block diagram showing the configuration of an embedded information analyzer analyzing an LVBC.

FIG. 23 is a block diagram illustrating a configuration of an embedded information analyzing unit 2301 analyzing the LVBC.

A dot detector 2302 detects arbitrary dots from an image having the embedded information (image in which an original image and the embedded information are mixed) and obtains coordinate positions of the dots.

A dot analyzer 2303 removes unnecessary dots such as dots composing a halftone or the like from the dots detected by the dot detector 2302.

An absolute coordinate list storage unit 2304 stores a list of the absolute coordinate positions of the dots.

A dot converter 2305 detects a rotation angle and a grid interval from the absolute coordinate position list stored in the absolute coordinate list storage unit 2304, and coverts the absolute coordinate positions into relative coordinate positions from the grid positions.

A relative coordinate list storage unit 2306 stores the relative coordinate positions.

A first region decoder 2307 extracts the embedded information embedded in the first region and outputs the extracted embedded information to a subsequent stage module.

A second region decoder 2308 extracts the embedded information embedded in the second region and outputs the extracted embedded information to the subsequent stage module.

The subsequent stage module is a functional module utilizing the embedded information, for example, a module changing the embedded information into a background image again to output a combined image or a module acquiring document information to perform reprint processing.

(Dot Detection)

Processing by the dot detector 2302 will be described in detail.

The dot detector 2302 receives an image scanned by the optical scanner in a format of a multi-value monochrome image. Meanwhile, the information to be embedded is embedded by binary monochrome dots in the information embedding method using the LVBC. Therefore, the dot detector 2302 receives the signal in a slightly deteriorated state caused by influences of an attached toner amount in the information embedding, sheet handling, an optical system for scanning, etc. Accordingly, the dot detector 2302, for eliminating these influences, recognizes the coordinate position by a received centroid position of the dot to improve detection accuracy.

Figure 24:
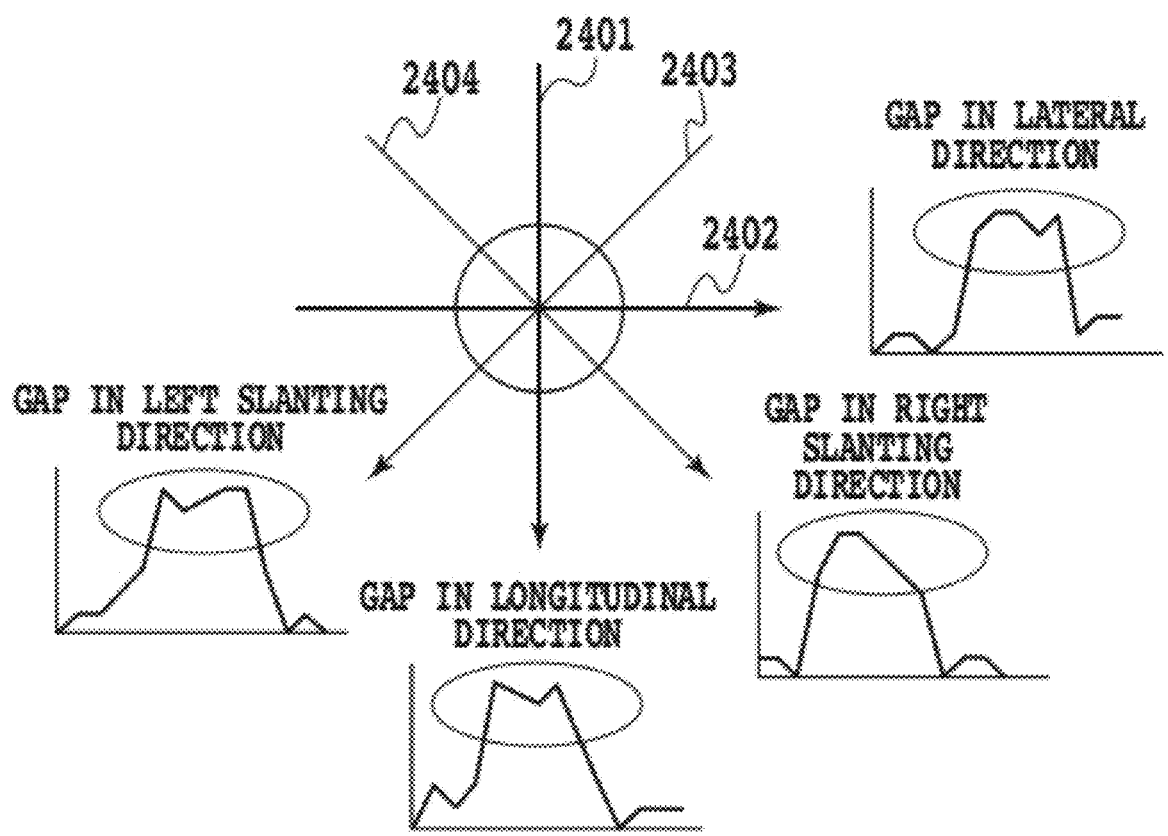
FIG. 24 is a conceptual diagram illustrating dot detection by a dot detector.

FIG. 24 is a conceptual diagram for illustrating the dot detection by the dot detector 2302.

The dot detector 2302 performs gap inspection against the image along four directions for examining an isolated point on the image. Reference numerals 2401 to 2404 indicate the directions for examining whether an isolated point exists or not. For example, when an inspection result along a vertical direction 2401 is "white", "white", "black", "black", "white", and "white", the black portion is probably an isolated point. In this inspection alone, however, there remains a possibility that the isolated point is located on a horizontal line. Similarly, even when an isolated point is determined probably to be located on a horizontal line in an inspection result along the horizontal direction line 2402, there is a possibility that the isolated point is actually located on a vertical line. Accordingly, the dot detector 2302 improves the detection accuracy by carrying out the isolated point inspection along the four directions 2401 to 2404. When the above described inspection results are obtained along all of the four directions 2401 to 2404 in a certain region, the black portion is recognized to be an isolated point.

(Dot Analysis)

Processing by a dot analyzer 2303 will be described in detail.

There is a case where the dot detector 2302 detects a dot other than a dot composing the LVBC. For example, a dot pattern expressing a halftone included in a document image, an isolated point originally included in a document (e.g., a voice sound mark of a Japanese syllabary character), or the like corresponds to such a case. Accordingly, it is necessary to remove the halftone for eliminating the dot which is not a dot composing the LVBC.

Figure 25:
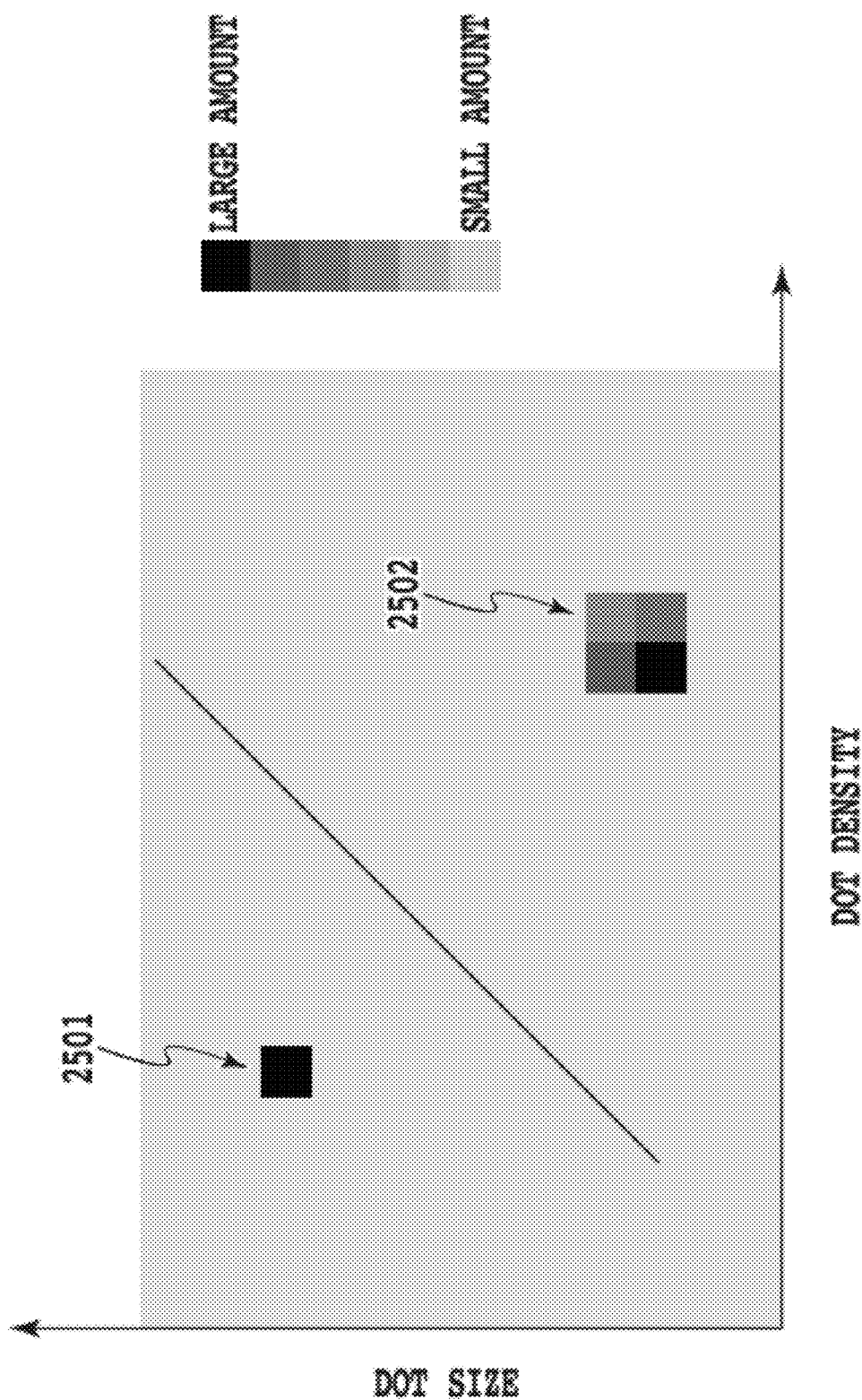
FIG. 25 is a graph illustrating half-tone removal.

FIG. 25 is a diagram illustrating a graph for illustrating the half tone removal.

The vertical axis of the graph indicates a dot size and the horizontal axis thereof indicates dot density. Also a histogram is shown in the graph to express a frequency of the dots by dot density. It is shown there that a dot appearance frequency is higher when the dot density is higher (darker).

For the LVBC, the dots are embedded to have the same size and the same density and the dot appearance frequency has a peak in a narrow region in the graph (2501). On the other hand, for the halftone, the dot size and the dot density are not regulated, and the dots appear sparsely in a wide region of the graph and an appearance frequency thereof is relatively low. Therefore, the dot analyzer 2303, by utilizing this characteristic, determines dots having an appearance frequency peak in a narrow range in the graph to be the dots of the LVBC and eliminates other dots. Accordingly, the absolute coordinate list storage unit 2304 stores only the LVBC dots.

(Dot Conversion)

Processing by a dot converter 2305 will be described in detail.

An image angle in the scanning is different from an image angle when LVBC dots have been embedded in the printing, because of a difference in a sheet direction in the scanner or a slight shift of a sheet angle in an analog level. Therefore, it is necessary to perform rotation angle detection and angle correction of an image. Also, since the LVBC embeds information by displacing dots composing a grid upward, downward, rightward, and leftward, in eight directions, it is necessary to reconstruct the original grid. Therefore, it is necessary to identify the original grid interval accurately.

Figure 26:
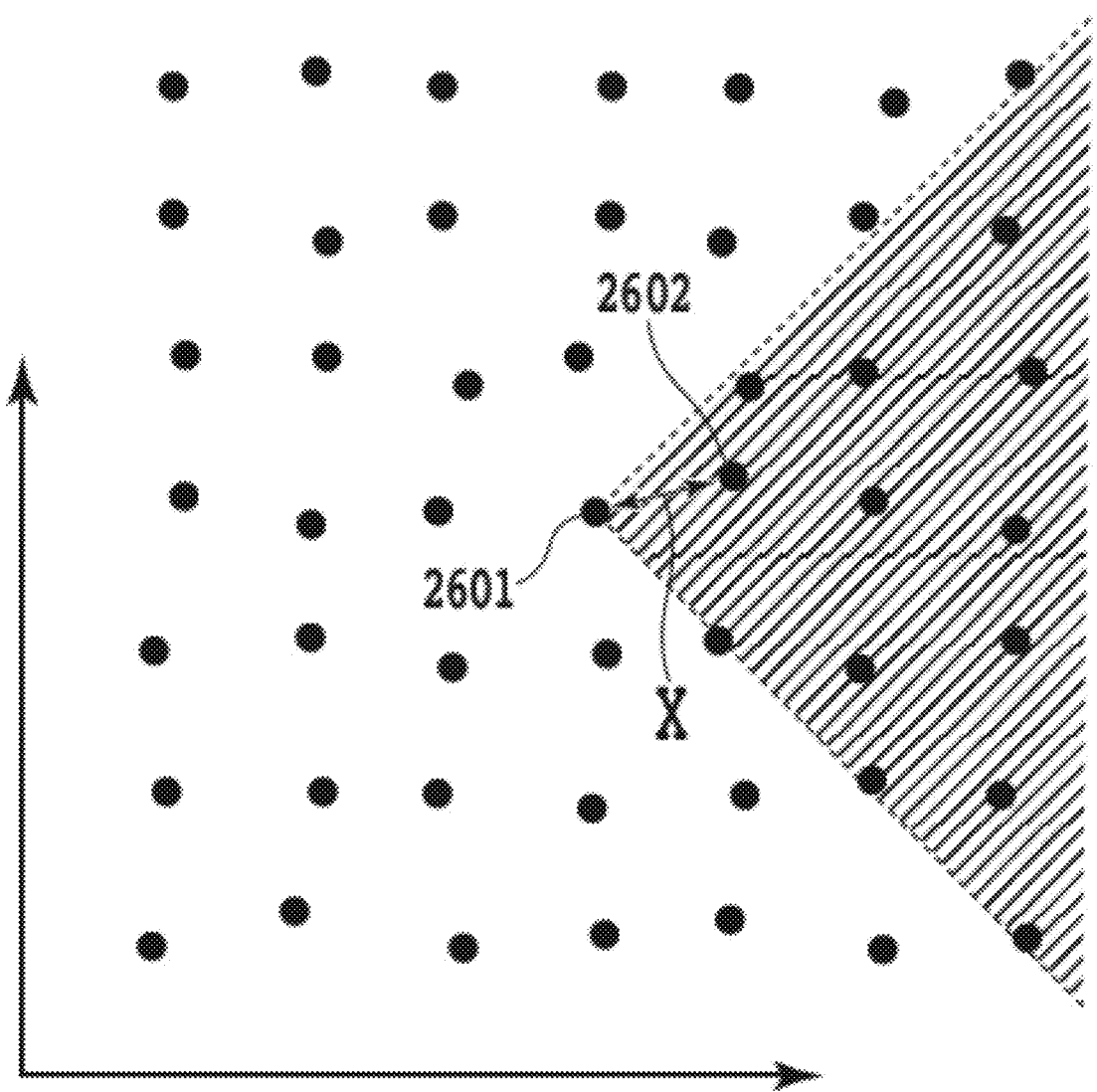
FIG. 26 is a schematic diagram illustrating a method of measuring a grid interval.

FIG. 26 is a schematic diagram illustrating a method of measuring the grid interval.

Focusing on a dot 2601, a distance X from the dot 2601 to a dot 2602 nearest to the dot 2601 is close to the grid interval.

While there are four dots located near the dot 2601 upward, downward, rightward, and leftward, only a dot located on the right side of the dot 2601 in a range of 90 degrees is made a candidate for the dot nearest to the dot 2601 for reducing a calculation amount. Specifically, when a relationship between a focused dot (x, y) and another arbitrary dot (a, b) satisfies $$a-x \leq 0 \text{ or } |a-x| \leq |b-y|,$$

the dot (a, b) is eliminated from the candidate. Then, a dot (a, b) having the smallest distance from the dot (x, y) is chosen to be the neighboring dot and the distance between the two dots X is made a candidate for the grid interval.

Here, the focused dot 2601 and also the neighboring dot 2602 are displaced. Also, dots recognized as dots of the LVBC actually might be dots of the halftone which the dot analyzer 2303 has failed to eliminate. Accordingly, the grid intervals are measured for all the focused dots (x, y) as described above and a histogram is generated expressing frequencies of the grid intervals for all the focused dots (x, y).

Figure 27:
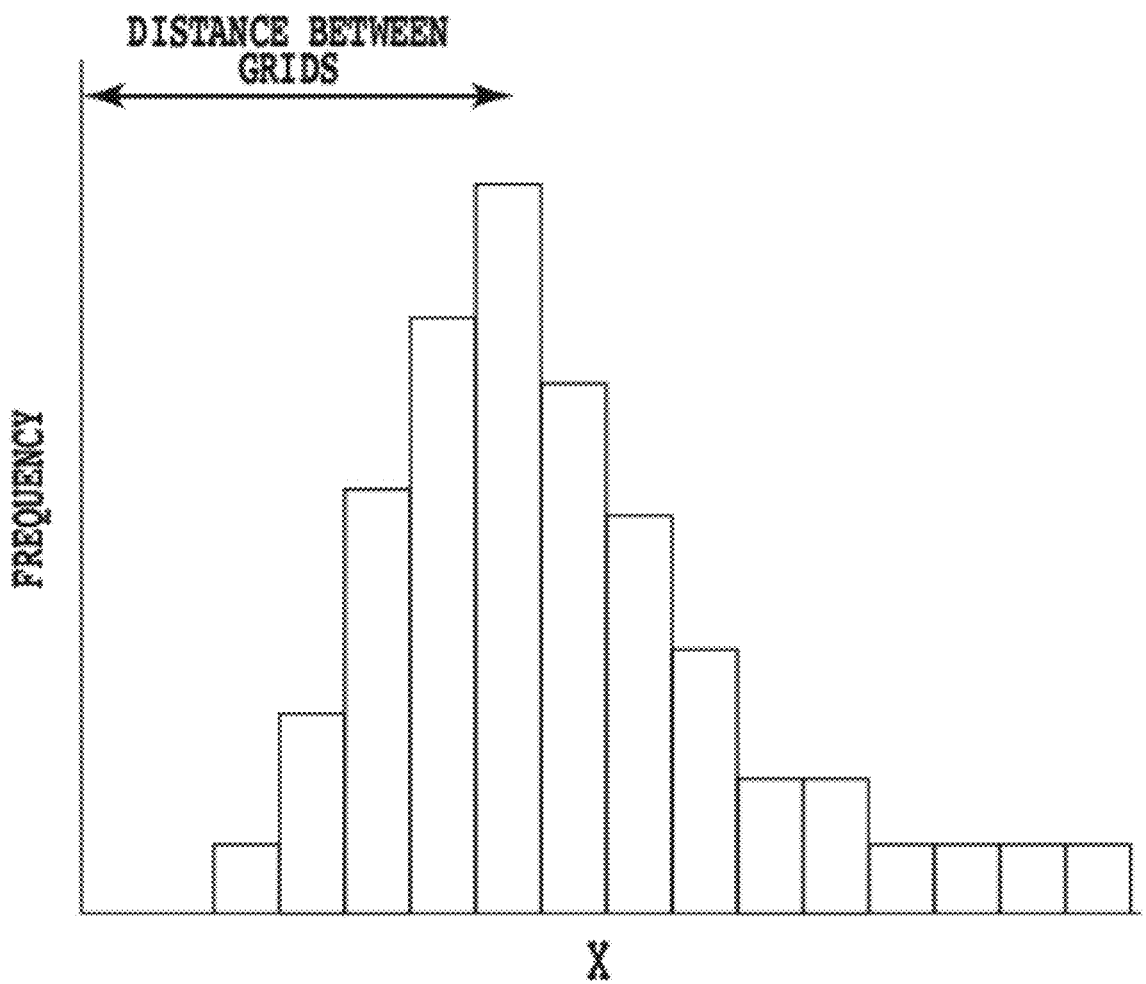
FIG. 27 is an example of a histogram showing the frequency of distances between grids.

FIG. 27 is a diagram illustrating an example of the histogram expressing frequencies of the grid intervals.

In FIG. 27, the horizontal axis expresses a distance value which is a candidate for the grid interval, and the vertical axis expresses a frequency in which the distance is measured at the focused dots (x, y). The drawing shows that the distance X having the highest frequency is recognized to be the grid interval. That is, assuming that appearance probabilities of the focused dot 2601 and the neighboring dot 2602 is the same in both of the vertical and horizontal directions, it is possible to determine the distance X having the highest frequency to be the grid interval from the histogram of a number of focused dots.

Figure 28:
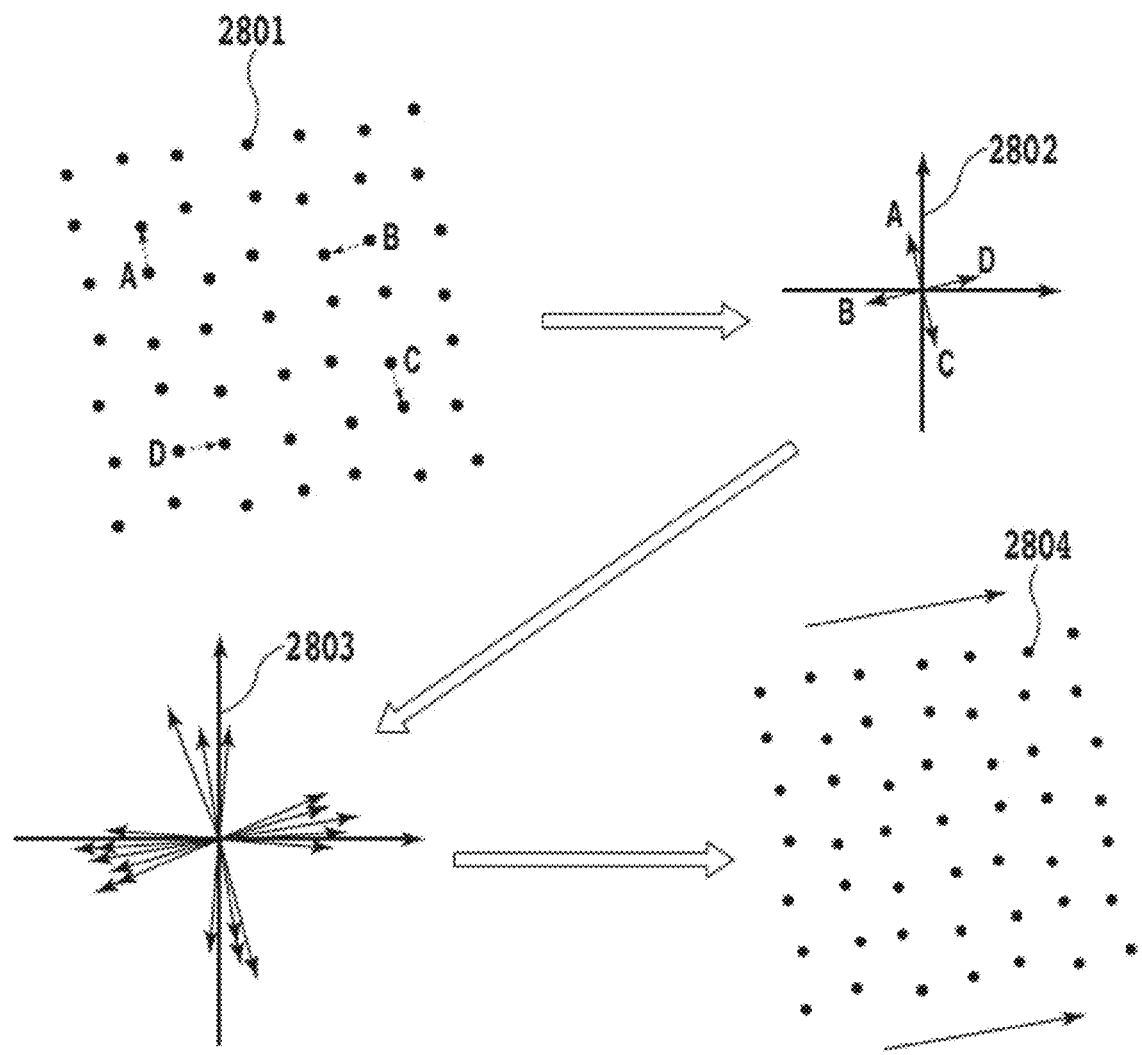
FIG. 28 is a diagram illustrating correction of rotation angles of grids.

FIG. 28 is a diagram illustrating correction of the grid rotation angle.

An angle from a dot to the neighboring dot thereof is measured for every dot in the drawing 2801.

Originally, an angle from a focused dot to the neighboring dot thereof should be any of 0, 90, 180, and 270 degrees and therefore it is possible to determine a rotation angle by correcting shifts of the measured angles. An angle θ from an individual focused dot to the neighboring dot is expressed by the following formula by defining a vector (dx, dy) from the focused dot to the neighboring dot thereof.

$$\theta = a\tan 2(dy, dx)$$

The drawing 2802 shows vectors to the respective neighboring dots, A, B, C, and D. Since the focused dots and also the neighboring dots are actually displaced slightly from the grid points, it is necessary to measure θ for every focused dot. Assuming that appearance probabilities of the displaced positions from the respective grid points of the focused dot 2801 and the neighboring dot thereof are the same in the vertical and horizontal directions, it is possible to measure the rotation angle of the grid in average by summing up angle shifts of all the focused dots. The drawing 2803 shows vectors of several dots and implies that the grid rotation angle can be approximated by overlapping these vector angles.

Specifically, the basic vector is calculated again from θ of each focused dot and a total angle φ is obtained from a summing up result of all the basic vectors. The summing up result (A, B) of the basic vectors is given as follows.

$$A = \sum_i \cos(4\theta_i)$$

$$B = \sum_i \sin(4\theta_i)$$

The grid rotation angle φ is approximated by the following formula.

$$\phi = a\tan 2(B, A)$$

For the absolute coordinate list stored in the absolute coordinate list storage unit 2304, grid angles are corrected by carrying out reverse rotation of the grid rotation angle.

A correction value of the rotation angle, while narrowed down to a rotation angle from every 90 degrees, is not yet narrowed down to a rotation angle from any of four angles, 0 (correct), 90, 180, or 270 degrees. This further narrowing-down will be described hereinafter.

Figure 29:
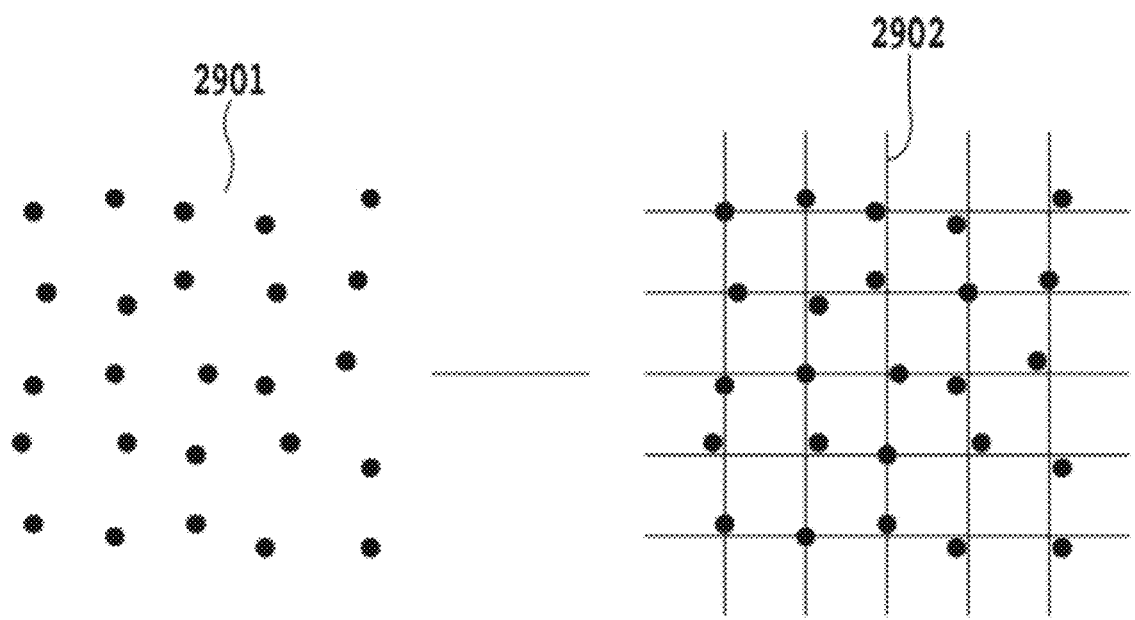
FIG. 29 is a diagram illustrating the result of correction of rotation and grid positions.

FIG. 29 is a diagram illustrating a rotation correction result and the grid points.

In FIG. 29, the drawing 2901 shows the absolute coordinate list of the LVBC dots after the rotation correction thereof has been completed. Further, as shown in the drawing 2902, hypothetical lines are drawn in every grid interval obtained in the dot converter 2305 in the X direction and Y direction, respectively, and intersections of the lines are assumed to be grid points. The displacement of dot coordinates is measured from this grid point.

(Identification of the First Region)

There will be described processing to identify the first region size 2003 and region repetition period 2004 shown in FIG. 20, and the first region position.

First, the repetition period 2004 of the first regions 2001 is determined. The first regions 2001 include the same data periodically and, when an autocorrelation is measured against the vertical direction with a certain offset, the autocorrelation becomes strong at an offset value equal to the repetition period 2004 to determine the repletion period 2004.

Figure 30:
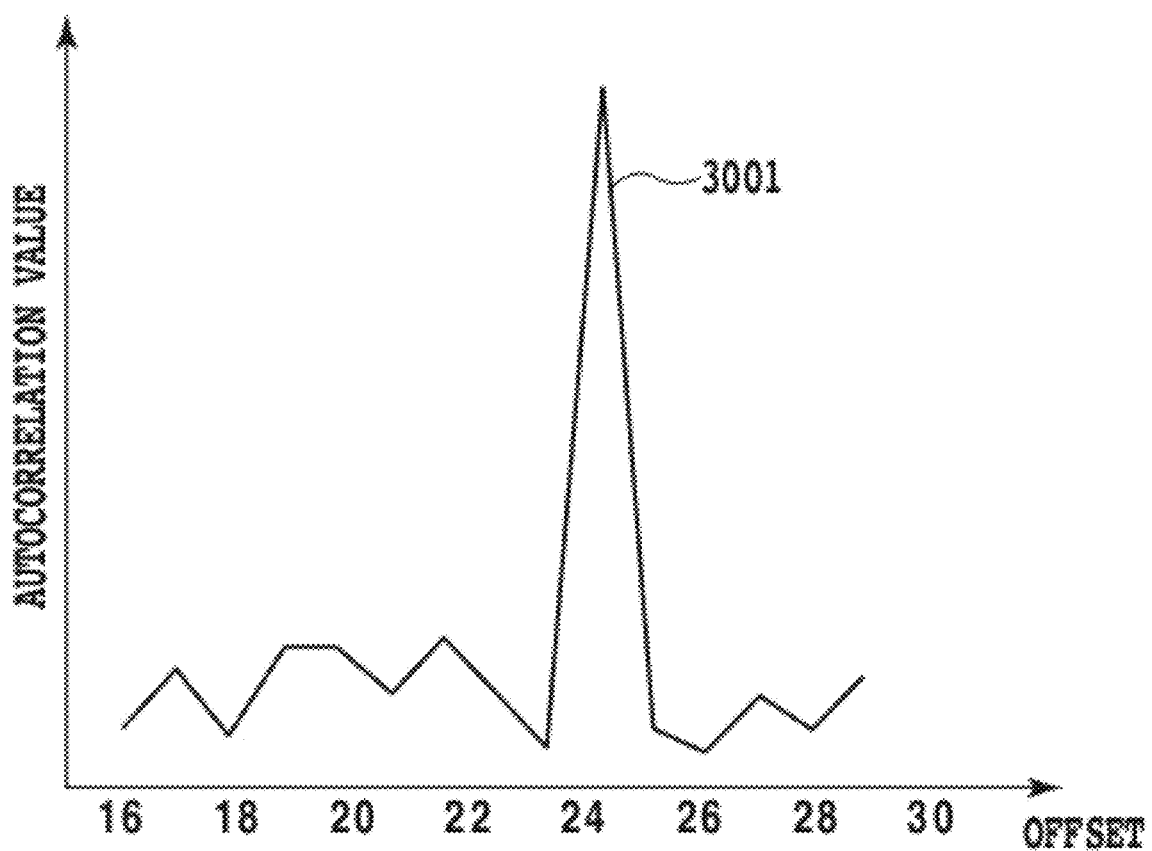
FIG. 30 is a graph showing an example of calculation of autocorrelation values corresponding to offset values.

FIG. 30 is a graph illustrating an example of calculated autocorrelation values against offset values.

The autocorrelation is a method to evaluate a frequency of particular embedded data appearing periodically and the autocorrelation value is a value to evaluate similarity of the embedded data at a particular offset value.

An autocorrelation function COR (A, B) for calculating the autocorrelation value is given by the following arithmetic expression.

$$COR(A,B) = \text{bitcount}(\text{not}(A \text{ xor } B)),$$

where "xor" indicates an exclusive OR of two terms and "not" indicates negation.

"bitcount" is a function to count the number of 1 in a bit sequence.

For example, when A is 010b and B is 011b, not (A xor B)=not (001b)=110b and "bitcount" becomes 2.

Here, it is assumed that the first region is a matrix having predetermined width and height and a bit sequence for evaluating the first region is CELL (x, y), where x and y are vertical and horizontal coordinates, respectively. For example, when the first region size is 8 in width and 8 in height, CELL (x, y) has a bit sequence length of 3 bits×8×8=192 bits for the first region having (x, y) at an upper left corner.

Here, the autocorrelation value for all the coordinates at a certain offset is expressed by the following function.

$$\text{Autocorrelation value(Offset)} = \Sigma_x \Sigma_y (COR(\text{CELL}(x,y), \text{CELL}(x,y\text{-offset})))$$

When the autocorrelation is calculated assuming that the first region size 2003 is 8 and the repetition period 2004 is 8×3=24, for example, the autocorrelation value has a peak 3001 at an offset of 24 and it is possible to determine the offset value of 24 to be the repetition period 2004.

Next, the position and size of the first region 2001 are determined. While the repetition period of the first regions has been determined by a measurement of the autocorrelation, it is necessary to determine a position in the period where the first region exists and the size of the first region.

Figure 31:
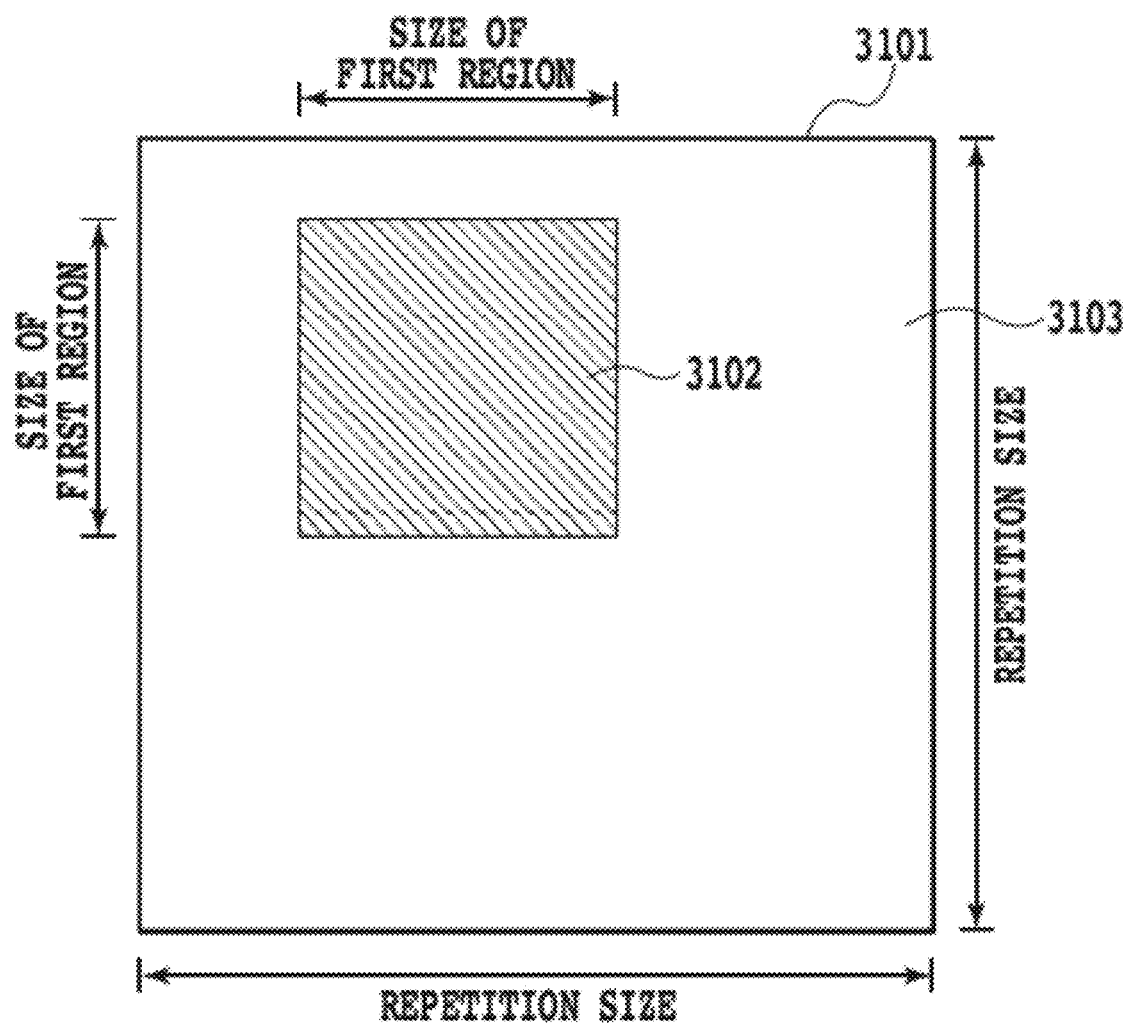
FIG. 31 is a diagram illustrating a method of determining the position of the first region.

FIG. 31 is a diagram for illustrating a method to determine the position of the first region.

Since the repetition period of the first regions has been already determined, an arbitrary regions having the same repetition period is cut out from the relative coordinate list storage unit 2306. Subsequently, a correlation is measured in regions neighboring on the regions, then a correlation is measured in further neighboring regions, and such processing is repeated. In this processing, portions of the first region 3102, where the same data appears in the repetition period, show a strong correlation. Other regions in the second region 3103, where the same data does not appear in the repetition period, show a weak correlation. Utilizing these characteristics, a start position of the portions having a strong correlation is identified to be a start position of the first region and a size to an end point of the portions having the strong correlation is determined to be a size of the first region.

(Decoding of the First Region)

The data in the first region is decoded using the position and size of the first region identified in the above described processing.

When only data in a single region is decoded, there is a possibility of misjudgment caused by measurement errors or noise. Accordingly, the positions of the dots embedded in all the first regions are counted, the most frequent value is employed and an occurrence probability of the value is calculated.

Figure 32:
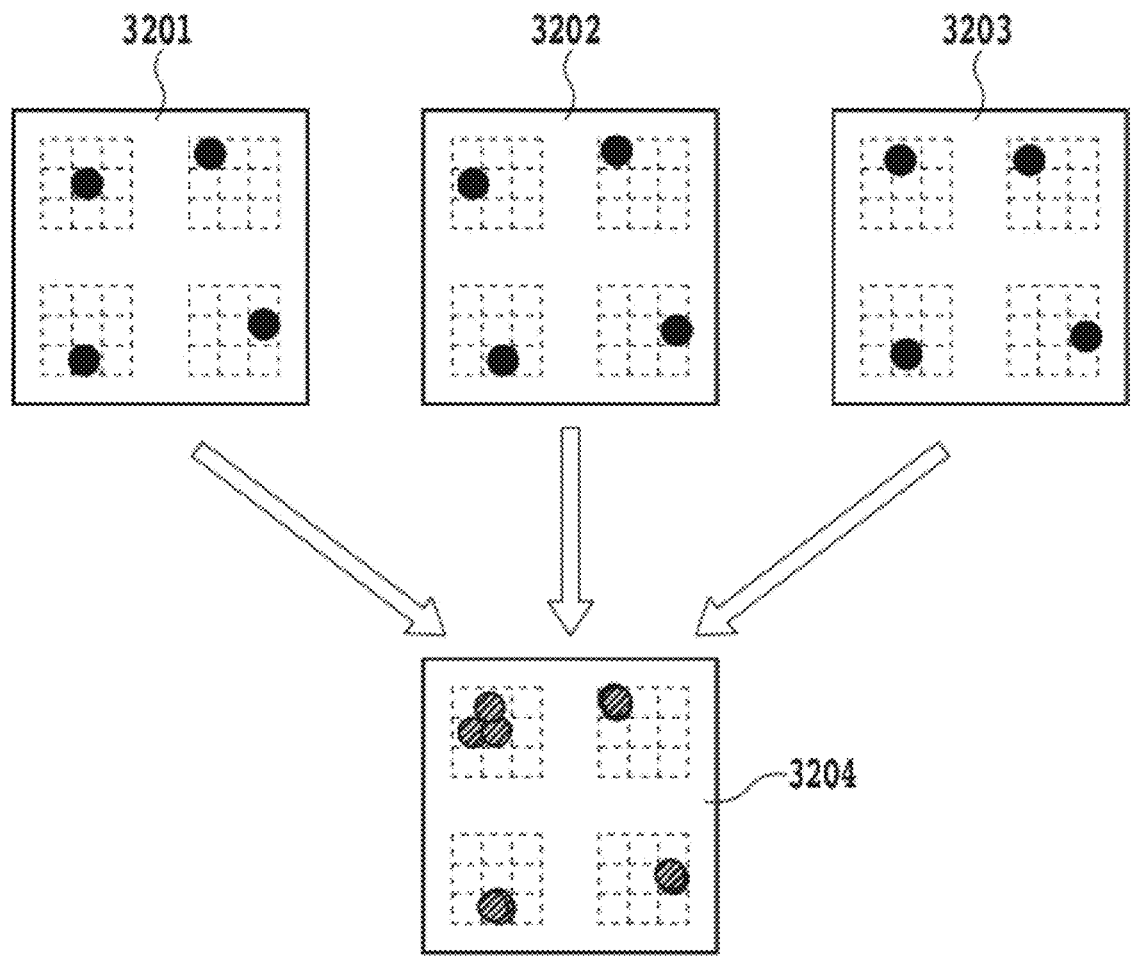
FIG. 32 is a schematic diagram illustrating summation of the first regions.

FIG. 32 is a schematic diagram for illustrating position counting of the dots embedded in the first regions.

In FIG. 32, Reference numerals 3201 to 3203 indicate the first regions located in different positions on a sheet. Reference numeral 3204 shows a result overlapping these first regions. While some shifts caused by noise or errors are recognized, the most frequent value is determined from a counting result of all the regions and therefore this value can be utilized.

Next, substantial decoding processing is performed. In this stage, influence of noise or measurement errors can not be perfectly eliminated, and the decoding processing is performed providing error correction processing to the decoded result.

First, the dot positions are detected from the dot patterns shown in FIG. 22 and converted into data corresponding to the positions, and a data sequence embedded in the first regions is extracted. In this data sequence, an error correction code, which detects data destruction and repairs the data destruction if possible, is recorded in the embedding other than copy prohibition data for an actual use.

While many error correction codes have been developed as well known techniques, this embodiment employs the LDPC (Low Density Parity Check) method. The LDPC is known to have a high error correction capability and to show characteristics close to the Shannon limit. Detailed description of the LDPC will be omitted. Also, any method other than the LDPC may be used as far as a function of the error correction code is provided.

It is possible to extract the embedded data using the error correction code even when the extracted grid includes a certain extent of errors or noise.

Further, as described in the rotation angle correction, the rotation angle correction is performed every 90 degrees and therefore there are four possible cases; data extracted here is correct data, data rotated by 90 degrees, data rotated by 180 degrees, or data rotated by 270 degrees from the correct data. Accordingly, decoding is carried out for the potential results in no rotation, 90 degree rotation, 180 degree rotation and 270 degree rotation of the extracted data performing the error correction by the LDPC. The error correction code functions effectively only in a correct rotation angle and it is possible to extract the data in a normal manner.

Figure 33:
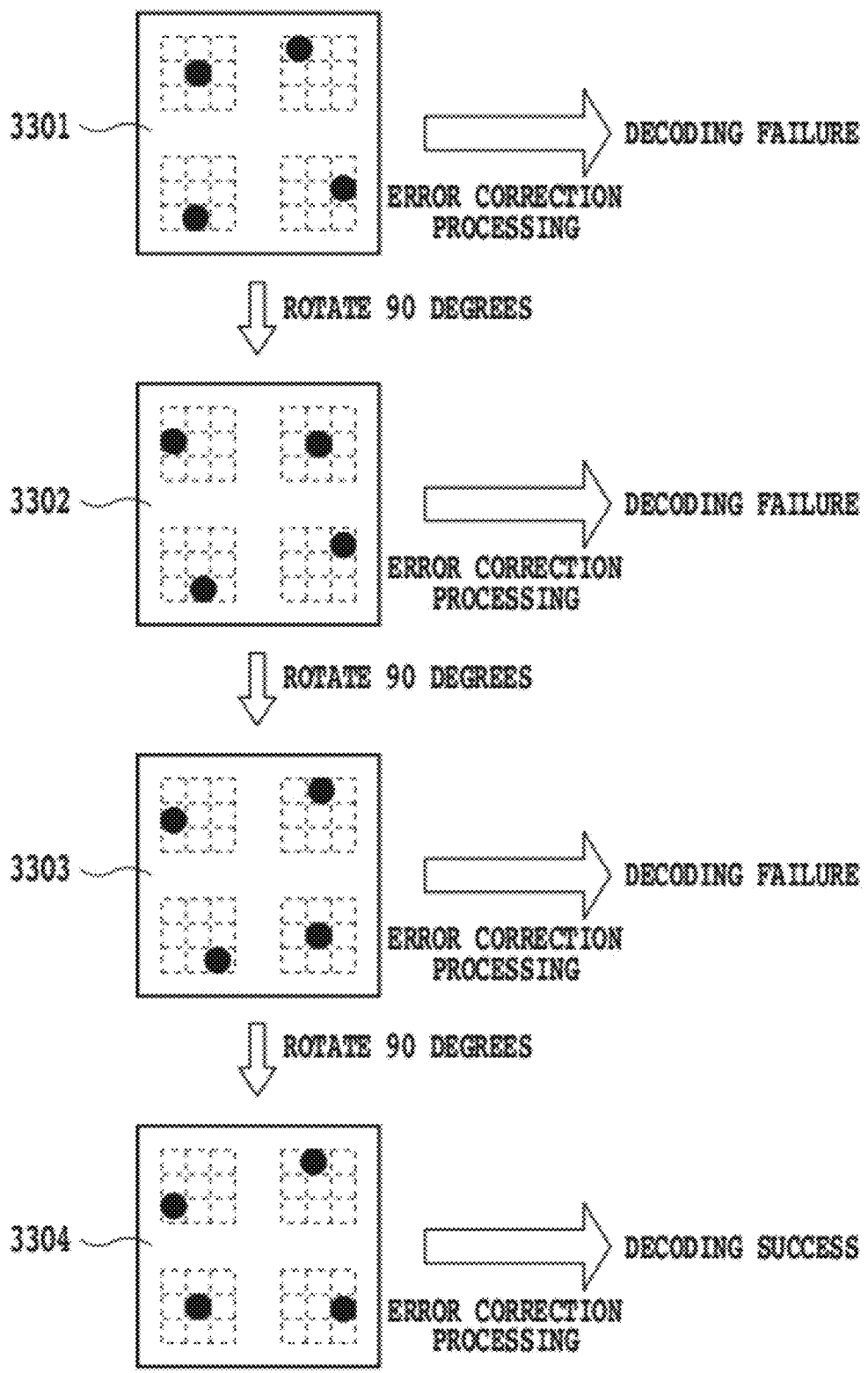
FIG. 33 is a diagram illustrating processing of decoding with error correction in consideration of rotation.

FIG. 33 is a diagram for illustrating decoding processing which performs the error correction in consideration of the rotation.

FIG. 33 shows an example in which the result of 270 degree rotation is extracted for the correct data. First, in the drawing 3301, the error correction processing is performed for the extracted data as is. While the correct data includes the error correcting code, the code becomes meaningless data by the rotation and can not correct errors. Then, in the drawing 3302, the error correction processing is performed for the data provided with a 90 degree rotation from the case shown in the drawing 3301. Similarly the error correction fails and the data can not be extracted. Then, in the drawing 3303, the error correction processing is performed for the data provided with a 90 degree rotation from the case shown in the drawing 3302. Similarly, the error correction fails and the data can not be extracted. Lastly, in the drawing 3304, the error correction is performed for the data provided with a 90 degree rotation from the case shown in the drawing 3303. Since this data is the correct data, the error correction succeeds and this data can be employed as an extracted data.

When the error correction has failed even in the drawing 3304, there is a possibility that the data extraction has failed because of a lot of errors or noise.

The embedded data stored in the first region can be extracted by the above processing.

(Identification of the Second Region)

The second region is a region used for registration of tracking information or the like and includes information which is not always required for performing copy operation. Accordingly, by omitting the decoding of the second region if not necessary, it is possible to suppress a speed reduction of the total processing.

An identification method of the second region will be described below.

First, similarly to the first regions, an autocorrelation is measured for the second regions. Since in the second regions embedding is performed in a period which is a plurality of the repetition period of the first regions, the autocorrelation may be measured in every any plurality of number of the repetition period of the first regions (24, 48, 72, . . . for the foregoing example) and some of the calculations can be omitted. Further, the repetition period of the second regions is the same as the size of the second region.

Figure 34:
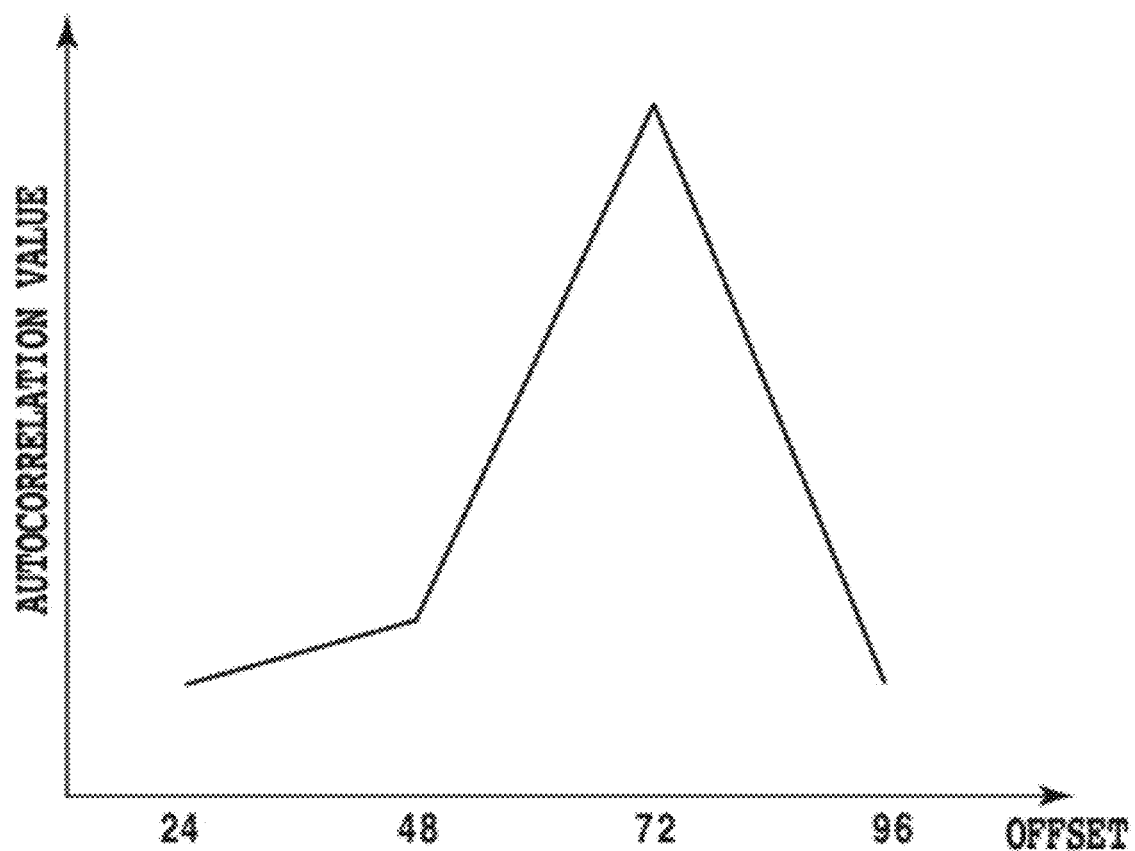
FIG. 34 is a graph illustrating an example of calculation of autocorrelation values corresponding to offset values in the second regions.

FIG. 34 is a graph illustrating an example of calculated autocorrelation values against offset values in the second regions.

Lastly, a start position of the second region is identified. Since the start position of the first region and the start position of the second region are synchronized in the embedding, the position can be narrowed down to any of the start position of the first region.

The error correction code is utilized for determining the position of the second region. Similar to the case of the first region, the error correcting code is added other than the embedded data for the second region. Sine the size of the second region is already known, the error correction processing is performed sequentially for potential regions from a top position of the first regions.

Figure 35:
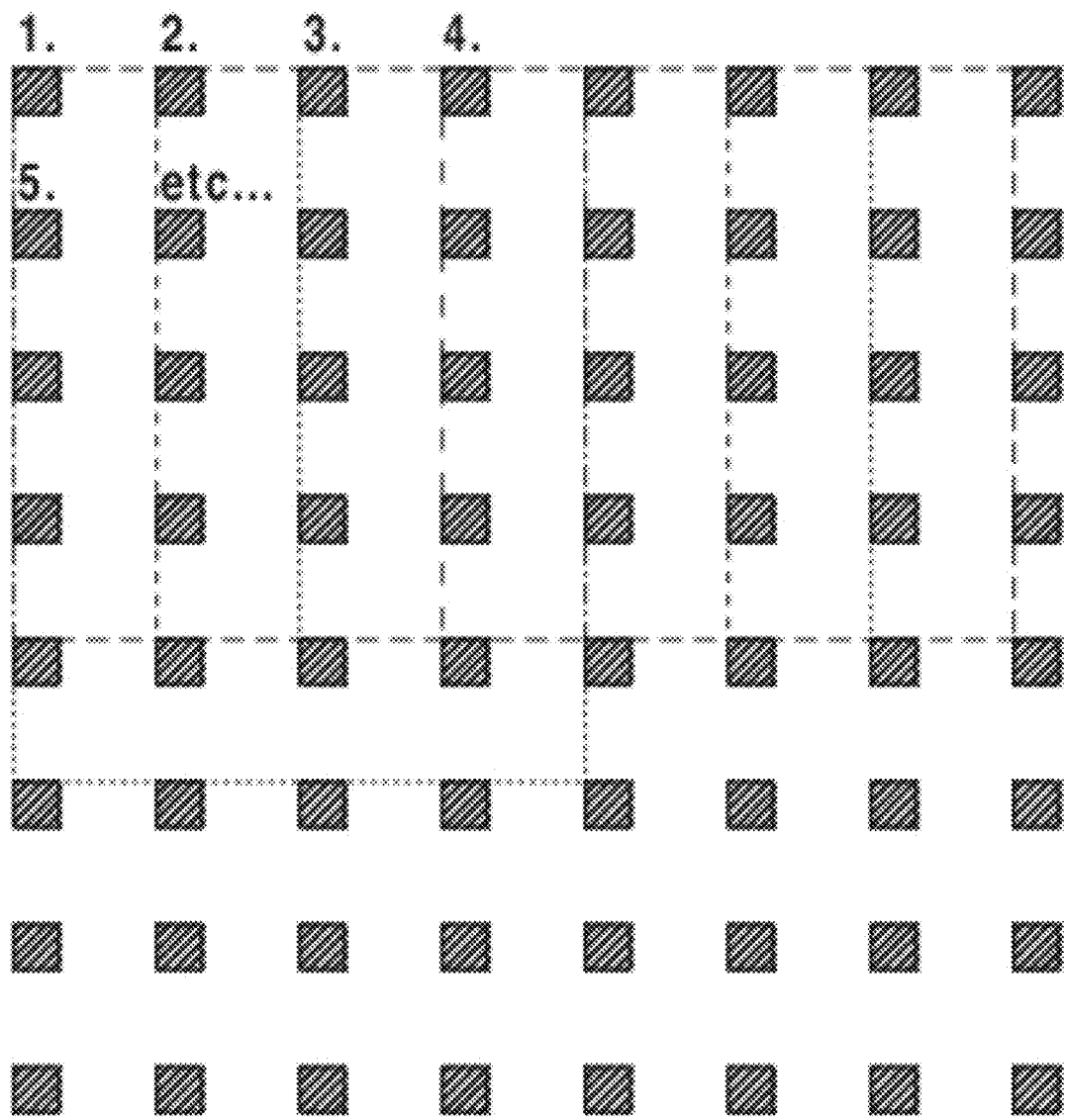
FIG. 35 is a diagram illustrating a method of determining the positions of the second regions.

FIG. 35 is a diagram for illustrating a method for identifying the second region position.

In FIG. 35, the autocorrelation shows that the second region size is four times the repetition period of the first regions. Here, any of 4×4=16 is to be the start position of the second region, and the error correction processing is applied by shifting the position as 1, 2, 3, 4, 5, etc. When the error correction processing has succeeded, it is possible to employ the position as the second region position.

The embedded data stored in the second regions can be extracted by the above processing.

(Relation Between Dot Area/Grid Interval and Visibility/Decodability)

In the embodiments, the dot visibility and the LVBC decodability are adjusted by changing the dot area (area per dot) and grid interval (interval between adjacent virtual points) of an LVBC step-by-step. Dot visibility means dot conspicuousness. When the dot visibility is high, dots are conspicuous. When the dot visibility is low, dots are inconspicuous.

Figure 13:
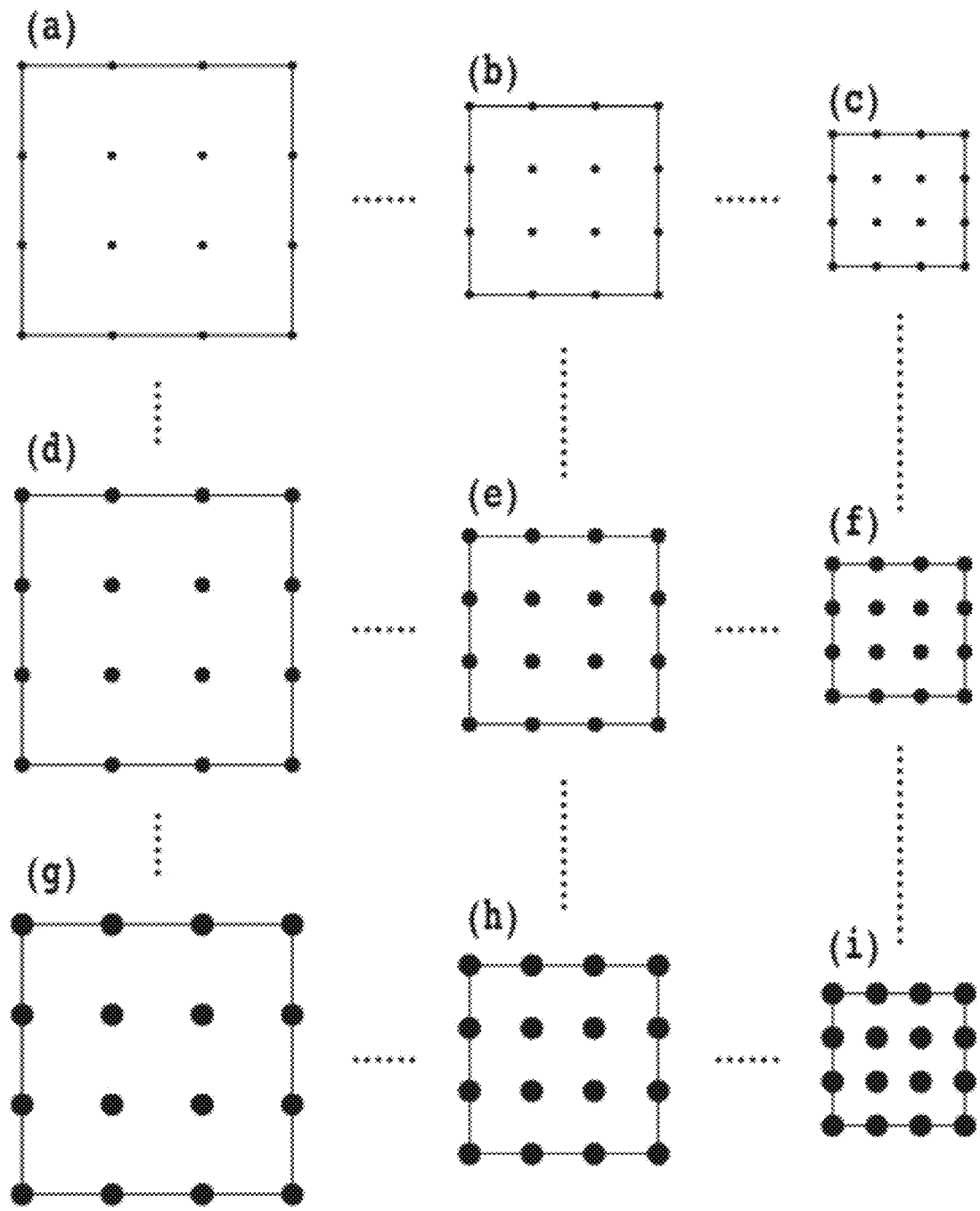
FIG. 13 is a diagram showing LVBC patterns generated by changing each of the dot area and grid interval of an LVBC step-by-step.

FIG. 13 is a diagram showing LVBC patterns generated by changing each of the dot area and grid interval of an LVBC step-by-step.

Reference mark (a) in FIG. 13 shows an LVBC in the case that the dot area is minimized and the grid interval is maximized. Reference mark (c) in FIG. 13 shows an LVBC in the case that the dot area is minimized and the grid interval is minimized. Reference mark (g) in FIG. 13 shows an LVBC in the case that the dot area is maximized and the grid interval is maximized. Reference mark (i) in FIG. 13 shows an LVBC in the case that the dot area is maximized and the grid interval is minimized. When the dot area can be set to m different sizes and the grid interval can be set to n different sizes, LVBCs of m×n different patterns can be generated. As understood from References mark (a) to (i) in FIG. 13, various LVBCs having a grid interval and a dot area which are not in proportion such as LVBCs having a small grid interval and a large dot area and LVBCs having a large grid interval and a small dot area are generated. As described later, in the present embodiments, an LVBC which is decodable and satisfies a predetermined condition is selected from among these LVBCs and embedded in an original document. Thus, the dot size of an LVBC can be determined to a size other than a size in proportion to the grid interval.

Figure 14:
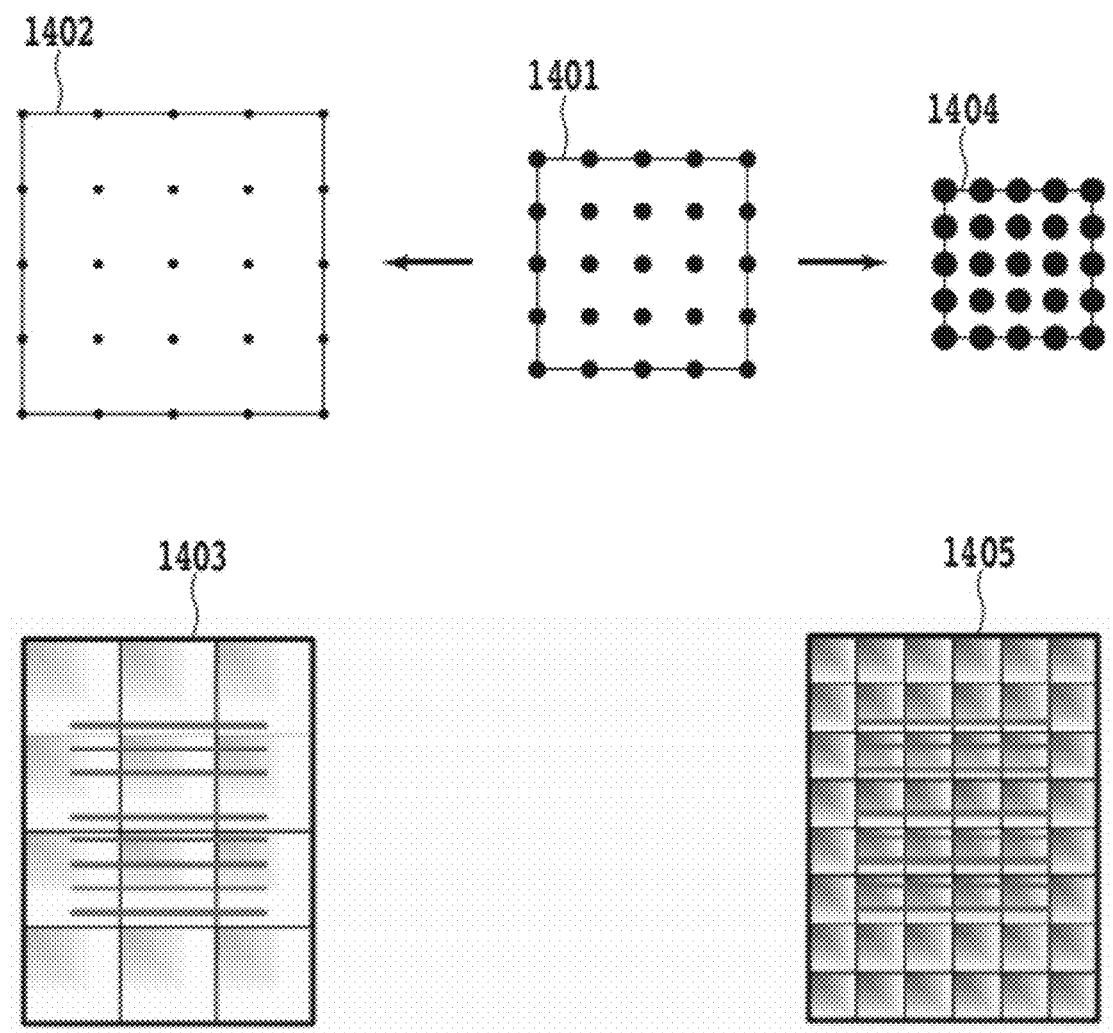
FIG. 14 is a diagram illustrating the relation between dot area/grid interval and visibility/decodability.

FIG. 14 is a diagram illustrating a relation between dot area/grid interval and visibility/decodability.

The reference numeral 1401 indicates an LVBC block composed of a dot group.

The reference numeral 1402 indicates an LVBC block which is reduced in dot area and increased in grid interval from the LVBC block 1401. The reference numeral 1403 indicates an original document in which the LVBC block 1402 has been embedded repeatedly. When the LVBC block 1402 is embedded in an original document, the visibility of the dot group is reduced, so that the influence that the LVBC exerts on the image quality can be suppressed small. However, since the LVBC block is large, the number of LVBC blocks which can be embedded in an original document becomes small. This means that the number of samples necessary to recognize the position of the dot group and decode additional information included in the first regions and the second regions becomes small. For this reason, it becomes difficult to accurately obtain the dot positions and thereby it becomes difficult to accurately decode the additional information.

The reference numeral 1404 indicates an LVBC block which is increased in dot area and reduced in grid interval from the LVBC block 1401. The reference numeral 1405 indicates an original document in which the LVBC block 1404 has been embedded repeatedly. When the LVBC block 1404 is embedded in an original document, the visibility of the dot group is increased, so that the influence that the LVBC exerts on the image quality becomes large. However, since the LVBC block is small, the number of LVBC blocks which can be embedded in an original document becomes large. This means that the number of samples necessary to recognize the position of the dot group and decode additional information included in the first regions and the second regions becomes large. For this reason, it becomes easy to accurately obtain the position of the dot group and thereby it becomes easy to accurately decode the additional information.

(Image Forming Device)

First, a configuration example of an image forming device capable of utilizing an information embedding/extracting technology using an LVBC, which becomes a premise of the embodiments of the present invention, will be described with reference to the drawings.

Figure 15:
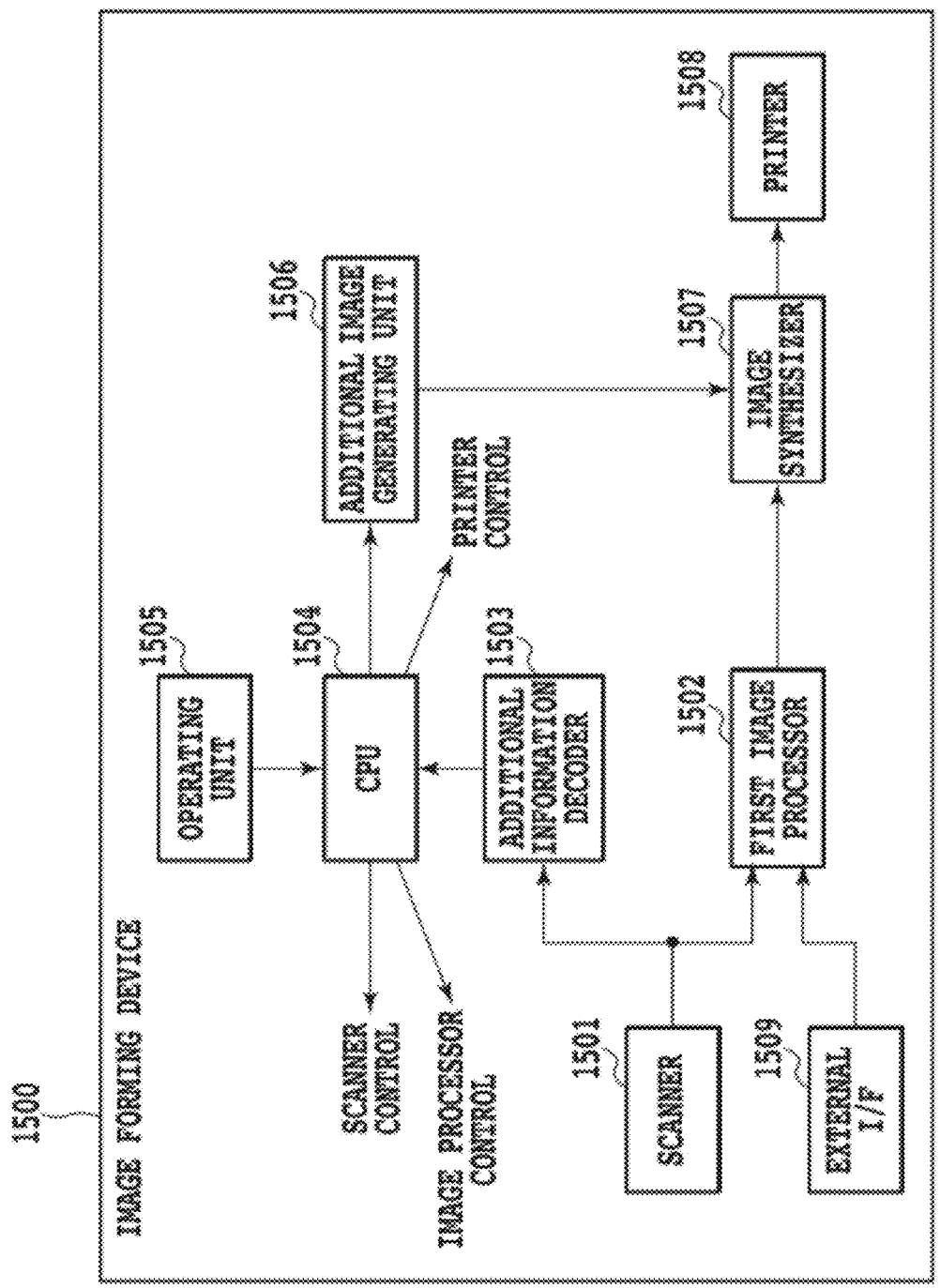
FIG. 15 is a block diagram showing a configuration example of an image forming device capable of utilizing an information embedding/extracting technology using an LVBC.

FIG. 15 is a block diagram showing a configuration example of an image forming device capable of utilizing an information embedding/extracting technology using an LVBC.

An image forming device 1500 includes a scanner 1501, an image processor 1502, an additional information decoder 1503, a CPU 1504, an operating unit 1505, an additional image generating unit 1506, an image synthesizer 1507, and a printer 1508.

The scanner 1501 optically scans an original document in which LVBCs are embedded, and outputs an RGB signal.

The image processor 1502 receives the RGB signal from the scanner 1501, performs various image processing such as filtering and color conversion, and outputs a signal corresponding to the type of the printer 1508. For example, when the printer 1508 is a color binary printer, the image processor 1502 outputs a binary image signal of CMYK.

The additional information decoder 1503 decodes additional information embedded in an original document scanned by the scanner 1501.

The CPU 1504 controls the entire image forming device 1500 on the basis of additional information set by a user through the operating unit 1505 or additional information decoded by the additional information decoder 1503. Furthermore, on the basis of the additional information, the CPU 1504 generates additional information embedded in an original document when it is printed.

The operating unit 1505 accepts an instruction from a user and presents internal information of the device to the user through a user interface screen. The user interface screen includes a setting screen for setting image processing contents and additional information and a screen displaying additional information.

The additional image generating unit 1506 generates an LVBC on the basis of additional information generated by the CPU 1504.

The image synthesizer 1507 receives an LVBC from the additional image generating unit 1506, synthesizes the LVBC and image data for printout received from the image processor 1502 to each other, and outputs synthesized image data for print.

The printer 1508 is a color binary printer using inks of four colors of CMYK, a color printer capable of color multilevel output, or a monochrome printer. The printer 1508 prints out synthesized image data received from the image synthesizer 1507.

The external I/F 1509 is a communication interface connecting the image forming device 1500 to a communication network such as a LAN. The image forming device 1500 transmits/receives various image data and control commands to/from other devices connected with the network through the external I/F 1509.

Figure 16:
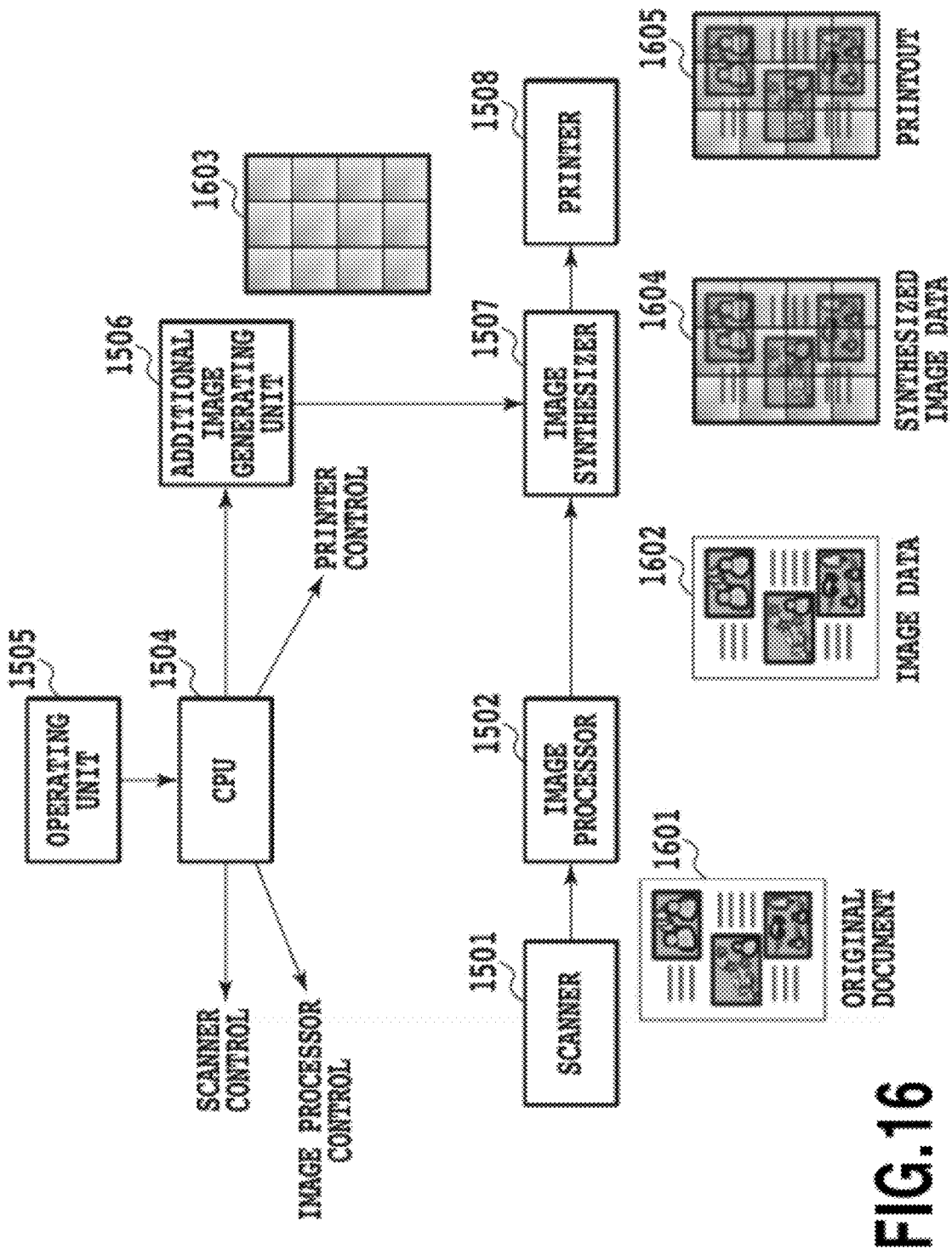
FIG. 16 is a diagram showing an operation example of an image forming device performed when an LVBC is embedded in an original document in which no LVBC has been embedded.

FIG. 16 is a diagram illustrating an operation example of the image forming device 1500 performed when an LVBC is embedded in an original document in which no LVBC has been embedded.

The scanner 1501 scans an original document 1601 in which additional information has not been embedded and outputs image data which has been scanned to the image processor 1502.

The image processor 1502 performs image processing set by a user through the operating unit 1505 on image data received from the scanner 1501 and outputs image data 1602 after the image processing.

The CPU 1504 outputs additional information set by a user through the operating unit 1505 to the additional image generating unit 1506.

The additional image generating unit 1506 generates an LVBC on the basis of additional information received from the CPU 1504.

The image synthesizer 1507 synthesizes image data 1602 received from the image processor 1502 and an LVBC received from the additional image generating unit 1506 to each other, and outputs synthesized image data 1604 for printout to the printer 1508.

The printer 1508 prints the received synthesized image data on an original document and outputs the result of the printout 1605.

In this connection, also when the printer 1508 does not print image data received from the scanner 1501 and prints image data received from the external I/F 1509, it only has to perform the above processing.

Figure 17:
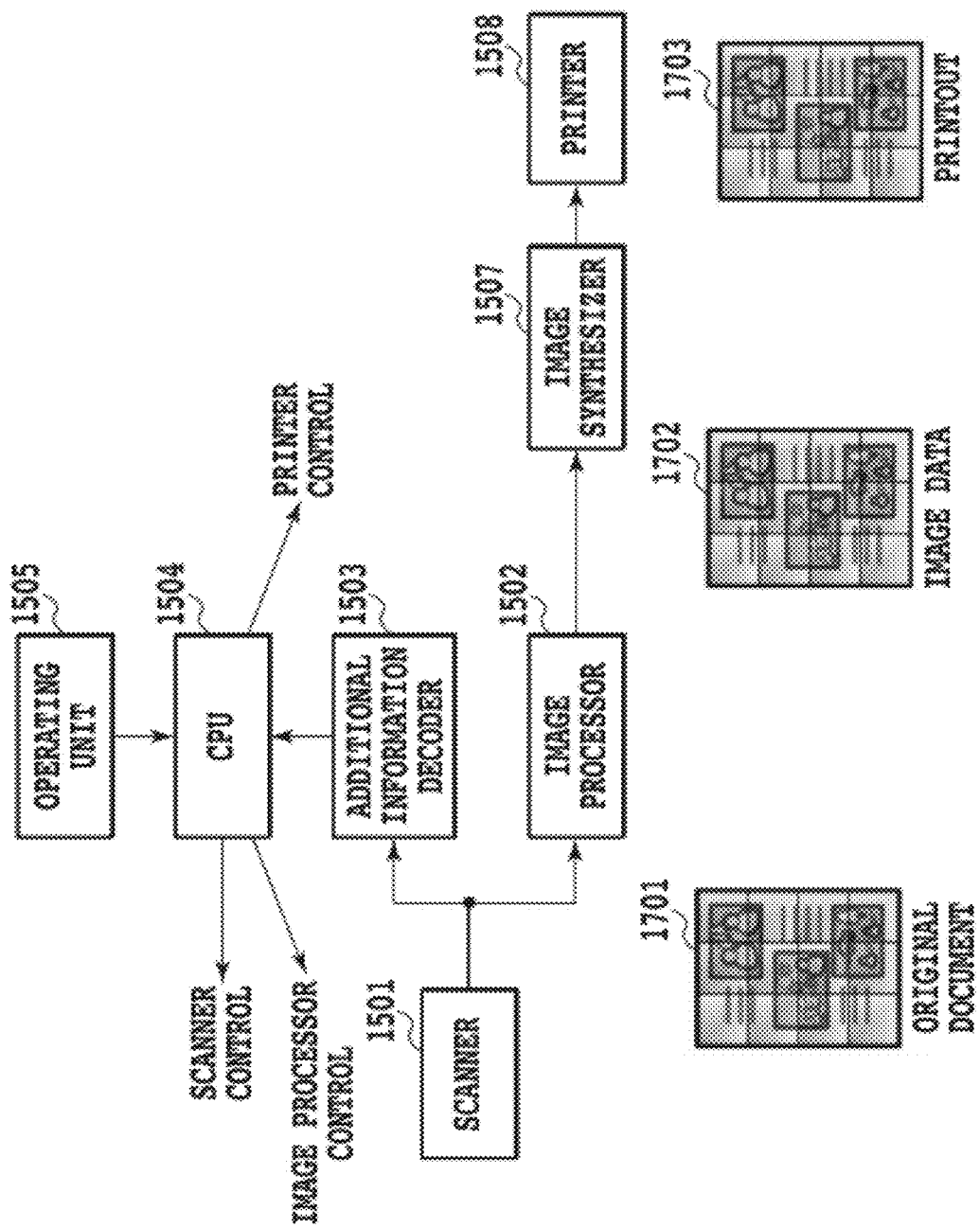
FIG. 17 is a diagram showing processing to switch set contents and operation contents of an image forming device on the basis of an LVBC embedded in an original document.

FIG. 17 is a diagram illustrating processing to switch set contents and operation contents of the image forming device 1500 on the basis of LVBCs embedded in an original document.

It is assumed that copy restriction information for permitting only specified users to make a copy is included in additional information indicated by an LVBC used in this example. Using copy restriction information allows the image forming device 4100 to let a person who is going to make a copy to input a password, permit the person to make a copy if the password is correct, and prohibit the person from making a copy if the password is incorrect.

The scanner 1501 scans an original document 1701 in which LVBCs are embedded and outputs image data to the additional information decoder 1503 and the image processor 1502.

The image processor 1502 performs image processing set by a user through the operating unit 1505 on image data received from the scanner 1501 and outputs image data 1702 after the image processing.

The additional information decoder 1503 extracts an LVBC from image data received from the scanner 1501 and decodes the LVBC to obtain additional information, and outputs the additional information to the CPU 1504.

The CPU 1504 lets the operating unit 1505 to display an authentication screen urging a user to input a password and determines whether the input password is correct or not on the basis of additional information received from the additional information decoder 1503. In other words, the CPU 1504 determines whether a user who is going to make a copy is an authorized user (a user permitted to make a copy). Subsequently, the CPU 1504 controls the image processor 1502, the image synthesizer 1507, and the printer 1508 according to the determination result.

When the input password is correct, the image processor 1502 outputs image data 1702 after image processing to the image synthesizer 1507. The image synthesizer 1507 outputs received image data to the printer 1508 as it is without performing any processing on the image data.

The printer 1508 prints received image data on an original document and outputs the printout result 1703.

On the other hand, when the input password is incorrect, the image processor 1502 does not output image data after image processing, so that nothing is printed.

First Embodiment

Embodiments of the present invention will be described in detail below with reference to the drawings.

The image forming device of the first embodiment adjusts a grid interval and a dot area before embedding an LVBC in an original document. Specifically, the image forming device generates LVBCs of two or more patterns by changing each of the grid interval and the dot area step-by-step between the minimum values and the maximum values of them, and determines whether or not each of the LVBCs is decodable. Then a LVBC having the least embedded amount of a dot group of decodable LVBCs is embedded in an original document. An embedded amount of a dot group encoded is the product of the dot area of one dot and the number of dots embedded per unit area. Thus, a dot group having the least area ratio per unit area of dot groups which have been determined to be decodable is embedded in an original document.

Figure 1:
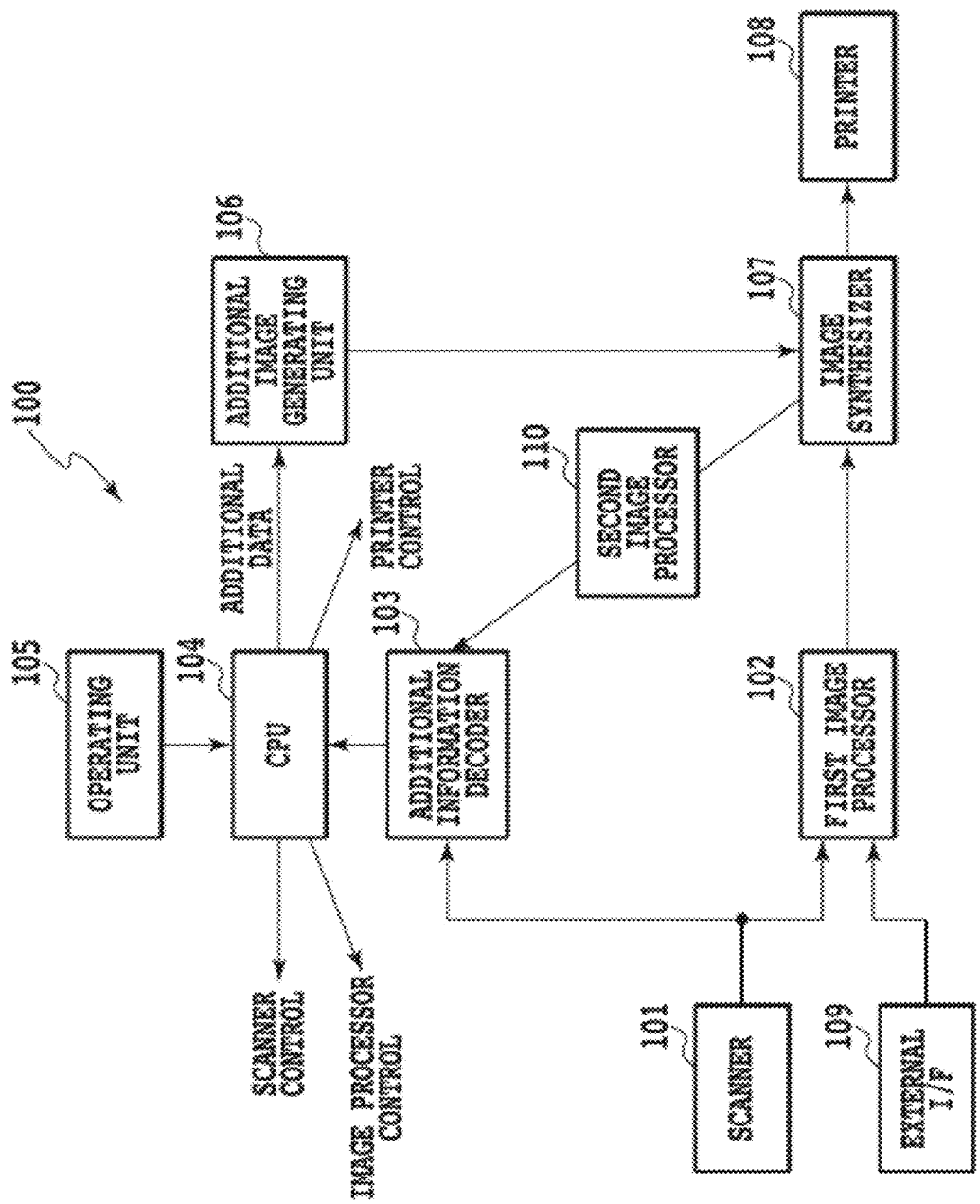
FIG. 1 is a block diagram showing a configuration example of the image forming device of a first embodiment.

FIG. 1 is a block diagram showing a configuration example of the image forming device of the first embodiment.

The image forming device 100 embeds LVBCs in an original document and decodes LVBCs embedded in an original document to obtain additional information.

The image forming device 100 includes a scanner 101, a first image processor 102, an additional information decoder 103, a CPU 104, an operating unit 105, an additional image generating unit 106, an image synthesizer 107, a printer 108, an external I/F 109, and a second image processor 110.

The scanner 101 optically scans an original document, and outputs an RGB signal.

The first image processor 102 receives the RGB signal from the scanner 101, performs various image processing such as filtering and color conversion, and outputs a signal corresponding to the type of the printer 108. For example, when the printer 108 is a color binary printer, the first image processor 102 outputs a binary image signal of CMYK.

The additional information decoder 103 decodes an LVBC to obtain additional information when the LVBC is embedded in an original document scanned by the scanner 101. In particular, the additional information decoder 103 receives the image data and determines whether or not the additional information is decodable, in other words, whether or not the additional information can be recognized. The details will be described later.

The CPU 104 controls the entire image forming device on the basis of additional information set by a user through the operating unit 105 or additional information decoded by the additional information decoder 103. In particular, the CPU 104 generates additional data for generating an LVBC on the basis of the additional information.

The operating unit 105 accepts an instruction from a user and presents internal information of the image forming device 100 to the user through the user interface screen. The user interface screen includes a setting screen for setting image processing contents and additional information and a screen displaying additional information.

The additional image generating unit 106 generates an LVBC on the basis of additional data generated by the CPU 104.

The image synthesizer 107 receives an LVBC from the additional image generating unit 106, synthesizes the LVBC and image data for which image processing has been finished received from the image processor 102 to each other, and outputs synthesized image data.

The printer 108 is a color binary printer using inks of four colors of CMYK, a color printer capable of color multilevel output, or a monochrome printer. The printer 108 prints out synthesized image data received from the image synthesizer 107.

The external I/F 109 is a communication interface connecting the image forming device to a communication network such as a LAN. The image forming device transmits/receives various image data and controls commands to/from other devices connected with the network through the external I/F 109. The second image processor 110 receives synthesized image data (image data in which an LVBC is embedded) from the image synthesizer 107 and performs image processing to simulate image deterioration at the time of printout and scanner scanning on the synthesized image data. For example, the second image processor 110 performs processing of color space conversion from image data of CMYK for printout to image data of RGB, smoothing processing using a smoothing filter, and density conversion processing using a look-up table.

Next, the flow of processing by the image forming device 100 will be described with reference to the drawings.

Figure 2:
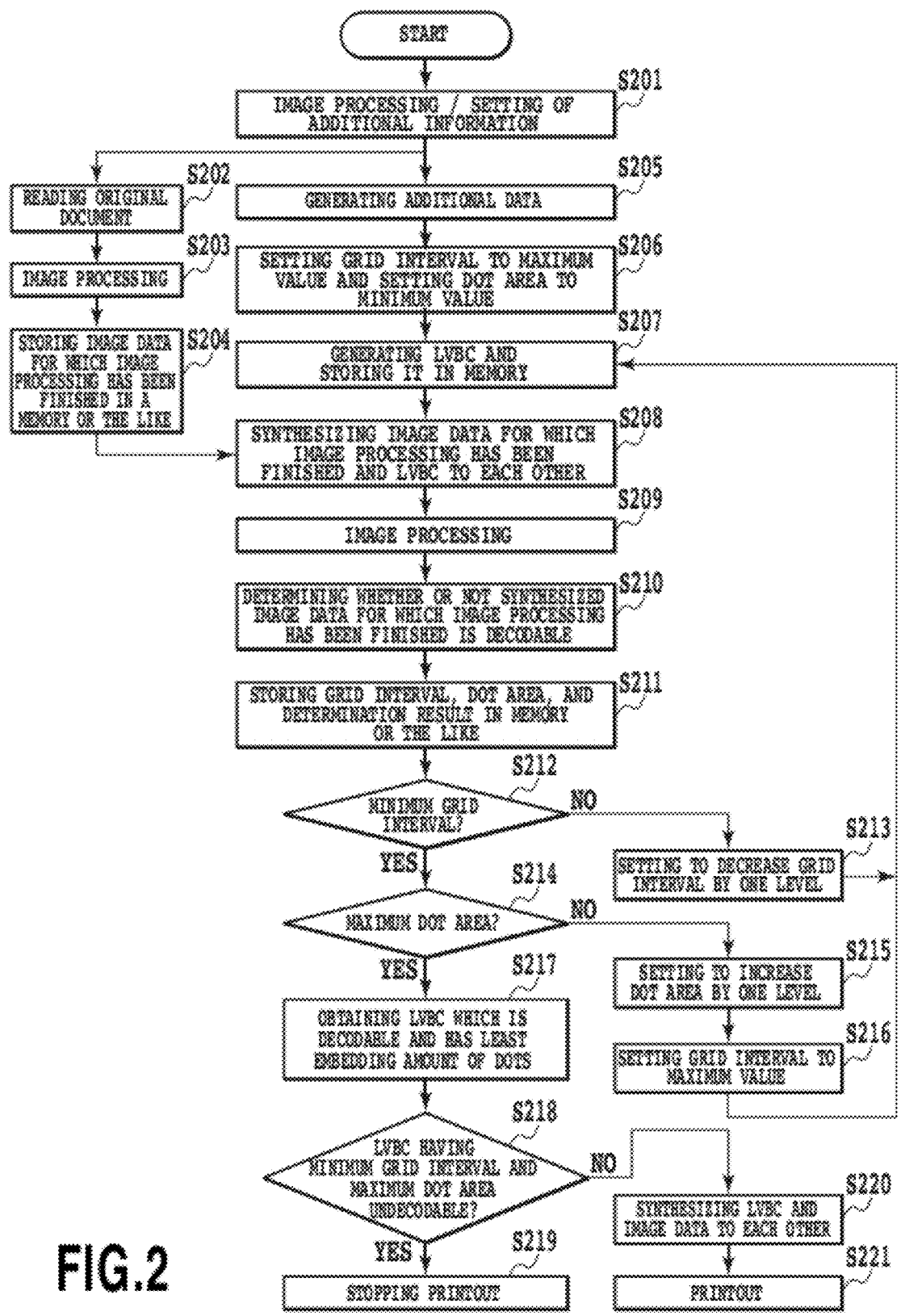
FIG. 2 is a flow chart showing the flow of processing by the image forming device of the first embodiment.

FIG. 2 is a flowchart showing the flow of processing by the image forming device of the first embodiment.

Figure 3:
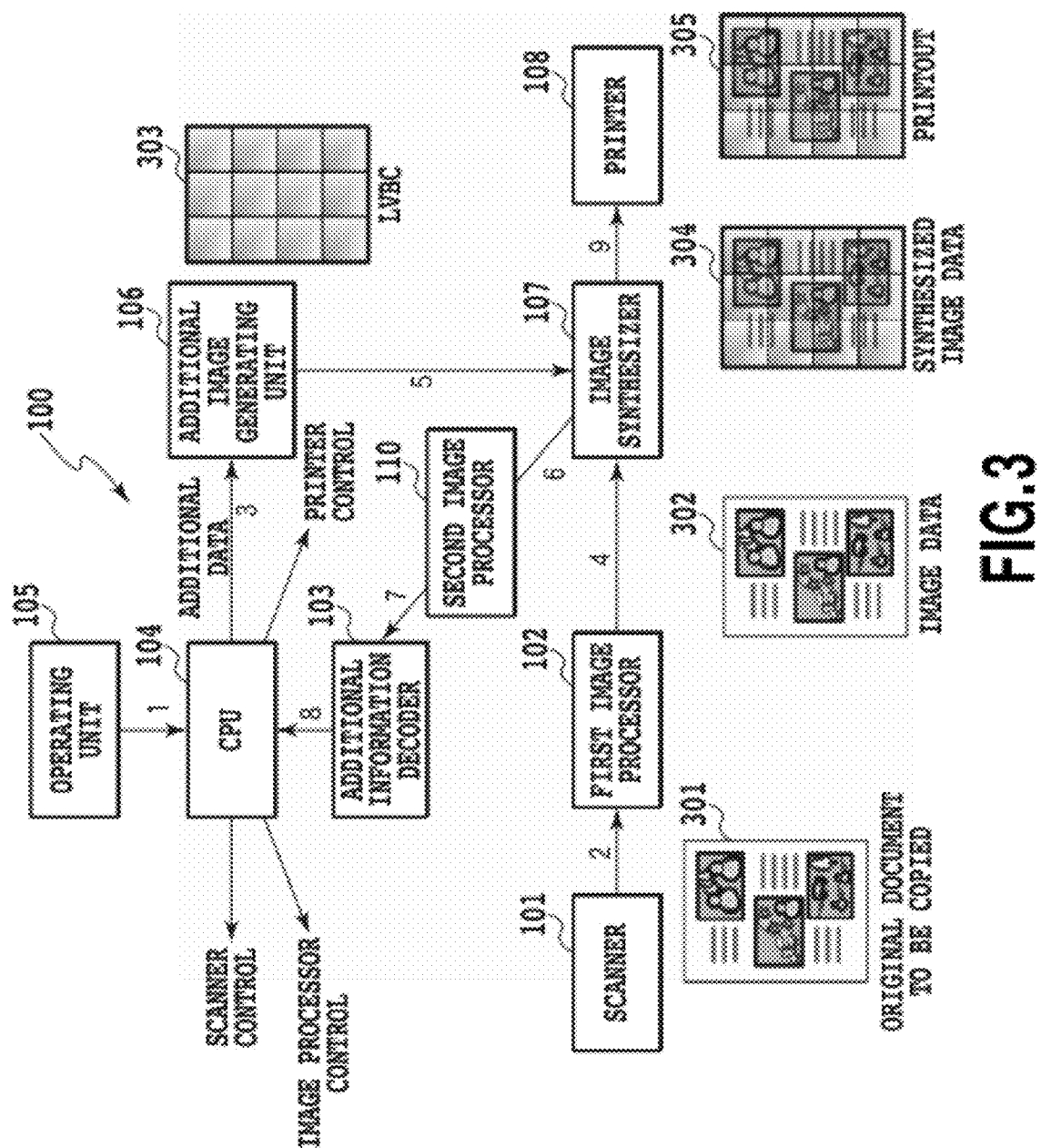
FIG. 3 is a diagram illustrating data flow between components of the image forming device of the first embodiment.

FIG. 3 is a diagram illustrating data flow among components of the image forming device 100 of the first embodiment.

Processing in the case of embedding an LVBC representing predetermined additional information when an original document in which no LVBC is embedded is copied will be described below with reference to FIGS. 2 and 3.

In step S201, the operating unit 105 sets the contents of image processing performed by the first image processor 102 and additional information and outputs set contents to the CPU 104 according to instructions from a user (refer to path 1 in FIG. 3). In step S202, the scanner 101 scans an original document in which no LVBC is embedded and outputs scanned image data to the first image processor 102 (refer to path 2 in FIG. 3). In step S203, the image processor 102 receives image data from the scanner 101 and performs image processing set by the operating unit 105 on the image data.

In step S204, the image processor 102 stores image data for which image processing has been finished in a storage medium such as a memory (not shown).

Processing of steps S205 to S207 is performed in parallel with processing of steps S202 to S204.

In step S205, the CPU 104 generates additional data on the basis of additional information set by the operating unit 105 and outputs the additional data to the additional image generating unit 106 (refer to path 3 in FIG. 3).

In step S206, the CPU 104 sets the grid interval to the maximum value and sets the dot area to the minimum value for the additional image generating unit 106.

In step S207, the additional image generating unit 106 generates an LVBC on the basis of the grid interval and the dot area which have been set and stores the LVBC in a storage medium such as a memory (not shown).

In step S208, the image synthesizer 107 synthesizes image data for which image processing has been finished stored in a memory or the like in step S204 and an LVBC similarly stored in a memory or the like to each other and outputs synthesized image data to the second image processor 110 (refer to paths 4 to 6 in FIG. 3).

In step S209, the second image processor 110 receives synthesized image data (image data in which an LVBC is embedded) from the image synthesizer 107 and performs image processing to simulate image deterioration at the time of printout and scanner scanning on the synthesized image data. Subsequently, the second image processor 110 outputs synthesized image data for which image processing has been finished to the additional information decoder 103 (refer to paths 6 and 7 in FIG. 3).

In step S210, the additional information decoder 103 determines whether an LVBC embedded in synthesized image data received from the second image processor 110 is decodable or not and outputs the determination result to the CPU 104 (refer to path 8 in FIG. 3).

In step S211, the CPU 104 stores the determination result received from the additional information decoder 103 in a storage medium such as a memory (not shown) along with a grid interval and a dot area which have been set.

In step S212, the CPU 104 determines whether a grid interval which has been set is the minimum value or not, and proceeds to step S213 when the grid interval is not the minimum value while proceeding to step S214 when the grid interval is the minimum value.

In step S213, the CPU 104 performs setting to decrease the grid interval by one level for the additional image generating unit 106 and subsequently performs the processing of steps S207 to S212. In other words, the CPU 104 repeats the processing of steps S207 to S213 until the grid interval becomes the minimum value. The CPU 104 may perform setting to decrease the grid interval by two or more levels at a time.

In step S214, the CPU 104 determines whether a dot area which has been set is the maximum value or not, and proceeds to step S215 when the dot area is not the maximum value while proceeding to step S217 when the dot area is the maximum value.

In step S215, the CPU 104 performs setting to increase the dot area by one level for the additional image generating unit 106. Note that the CPU 104 may perform setting to increase the dot area by two or more levels at a time.

In step S216, the CPU 104 performs setting to maximize the grid interval for the additional image generating unit 106 and then performs processing of steps S207 to S213. In other words, the CPU 104 repeats the processing of steps S207 to S216 until the dot area becomes the maximum value.

Figure 4:
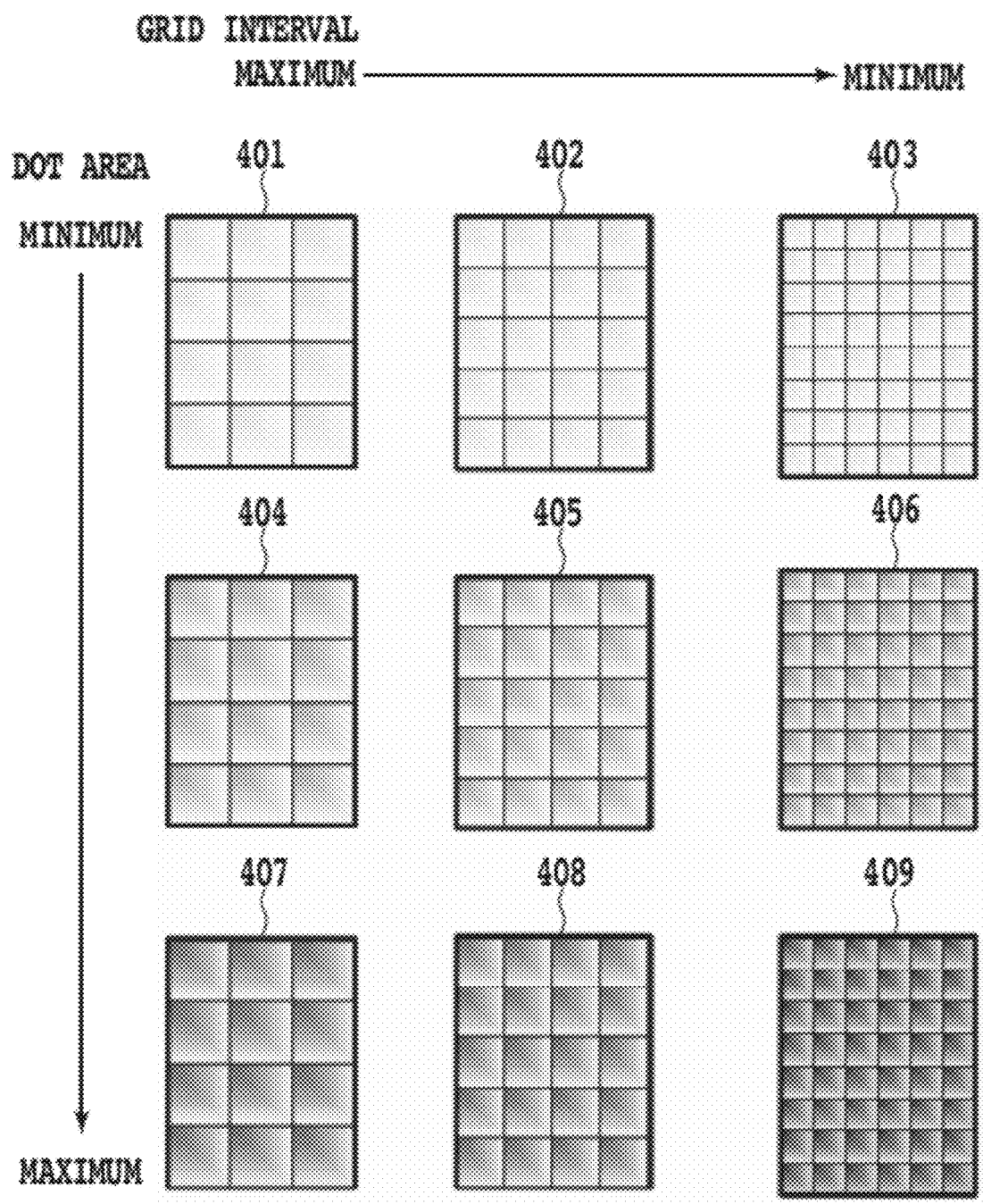
FIG. 4 is a diagram showing LVBCs of two or more patterns generated in the first embodiment.

FIG. 4 shows LVBCs of two or more patterns generated by the above repetition processing.

In FIG. 4, the reference numerals 401 to 409 each indicates an LVBC. As shown in FIG. 4, the LBVCs of nine patterns are generated in the order from 401 to 409, and it is determined whether each of the LBVCs is decodable by performing the processing of steps S207 to S216 shown in FIG. 2. The reference numeral 401 indicates an LVBC generated when the grid interval is set to the maximum value and the dot area is set to the minimum value, the LVBC being visually most inconspicuous. In contrast to this, the reference numeral 409 indicates an LVBC generated when the grid interval is set to the minimum value and the dot area is set to the maximum value, the LVBC being visually most conspicuous.

In step S217, the additional information decoder 103 obtains an LVBC which is decodable and has the least embedded amount of a dot group, from combinations of a grid interval, a dot area, and a determination result (whether an LVBC is decodable or not) stored in a memory or the like in step S211. A method of obtaining it will be described later.

In step S218, the additional information decoder 103 proceeds to step S219 when the LVBC (indicated by the reference numeral 409 in FIG. 4) having the minimum grid interval and the maximum dot area is undecodable.

In step S219, the CPU 104 determines to stop the printout and displays a message such as "It is impossible to embed decodable additional information" on the operating unit 105.

In step S220, the additional information decoder 103 outputs an LVBC which is decodable and has the least embedded amount of a dot group to the image synthesizer 107. The image synthesizer 107 synthesizes image data received from the first image processor 102 and the LVBC to each other and outputs synthesized image data to the printer 108 (refer to paths 4, 5, and 9 in FIG. 3).

In step S221, the printer 108 prints out received synthesized image data.

FIG. 5 is a diagram showing relations among grid intervals, dot areas, whether LVBCs are decodable or not, and embedded amounts of a dot group.

The additional information decoder 103 obtains an LVBC which is decodable and has the least embedded amount of a dot group using relations between whether LVBCs are decodable or not and embedded amounts of a dot group. It is assumed that the grid interval can be set to four levels from the maximum value of 4 mm to the minimum value of 0.5 mm, and the dot area can be set to four levels from the minimum value of 1 µm² to the maximum vale of 6 µm². Thus, in this case, LVBCs of 16 patterns are generated. From FIG. 5, it is understood that LVBCs of 8 patterns are decodable. In other words, LVBCs having a grid interval of 2 mm and a dot area of 4 µm² or 6 µm², LVBCs having a grid interval of 1 mm and a dot area of 2 µm², 4 µm² or 6 µm², and LVBCs having a grid interval of 0.5 mm and a dot area of 2 µm², 4 µm² or 6 µm² are decodable. On the other hand, in this example, it is assumed that an embedded amount of a dot group is the product of the number of dots embedded per unit area (1600 mm² in this example) and a dot area. Thus, for example, in the case that the grid interval is 4 mm, the number of embedded dots is 100, and therefore the embedded amount of dots in the case that the dot area is 1 µm², 2 µm², 4 µm², or 6 µm² is 100, 200, 400, or 600, respectively. The least embedded amount of dots in embedded amounts of dots of the above decodable patterns is 1600, and the grid interval and the dot area in that case are 2 mm and 4 µm², respectively.

Second Embodiment

The first embodiment is a method of determining whether LVBCs of all patterns obtained from combinations of all settable grid intervals and all settable dot areas are decodable or not. However, in this method, as combinations of settable grid intervals and settable dot areas increase, LVBC patterns generated increase, and therefore a processing time needed for generating LVBCs and a processing time needed for decoding LVBCs become long. Furthermore, a problem exists that the capacities of memories storing LVBCs generated and decoding results become large.

In contrast to this, the second embodiment does not determine whether LVBCs of all patterns obtained from combinations of all settable grid intervals and all settable dot areas are decodable or not. The second embodiment first determines whether LVBCs are decodable or not while decreasing the grid interval step-by-step, and embeds a decodable LVBC in an original document immediately at the step where the decodable LVBC is detected. When it is impossible to decode the LVBC even if the grid interval is minimized, the second embodiment then determines whether the LVBC can be decoded while increasing the dot area step-by-step in the state that the grid interval is minimized, and embeds a decodable LVBC in an original document when detecting the decodable LVBC.

Figure 6:
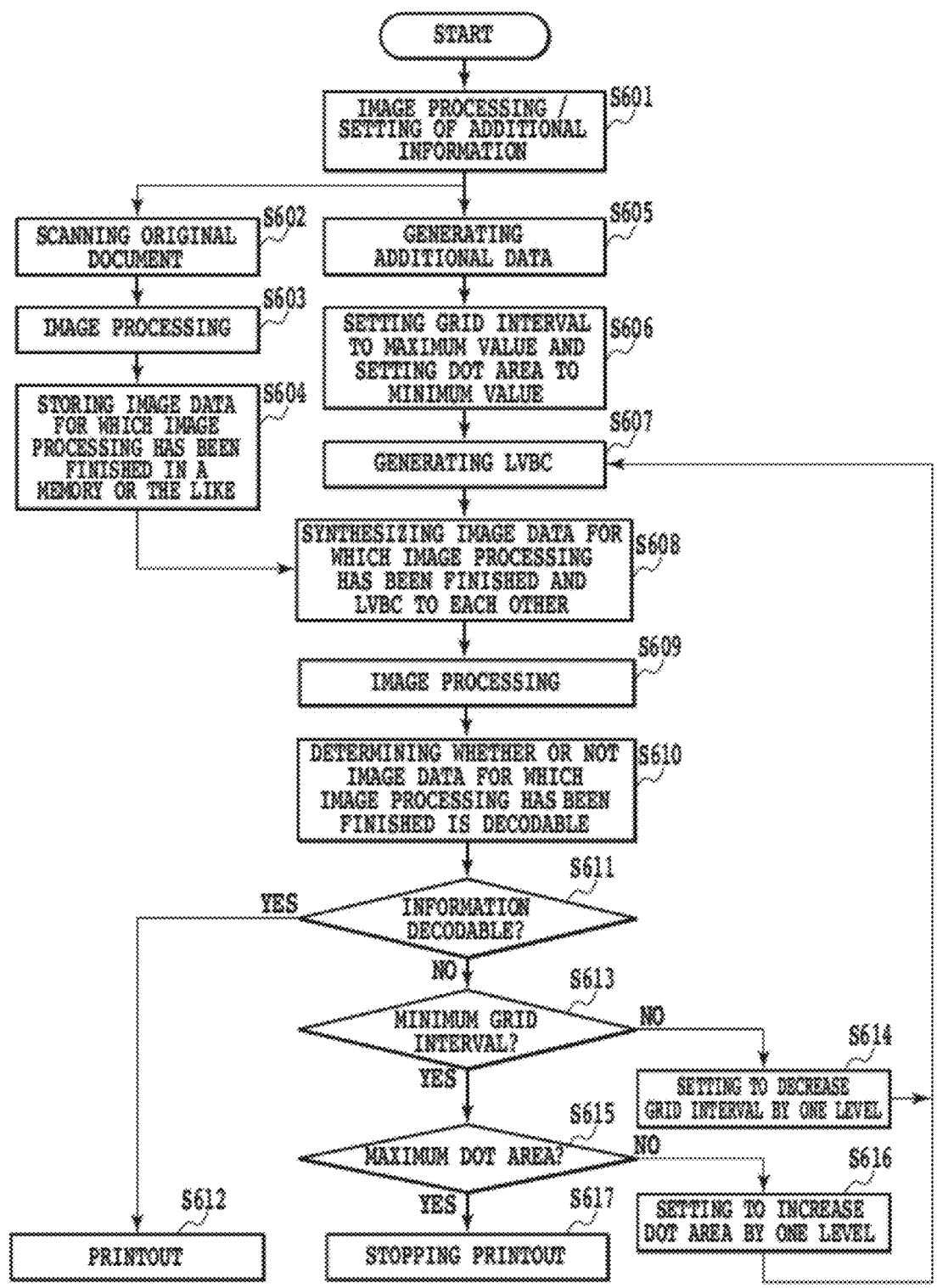
FIG. 6 is a flow chart showing the flow of processing by an image forming device of a second embodiment.

FIG. 6 is a flow chart showing the flow of processing by the image forming device of the second embodiment.

Figure 7:
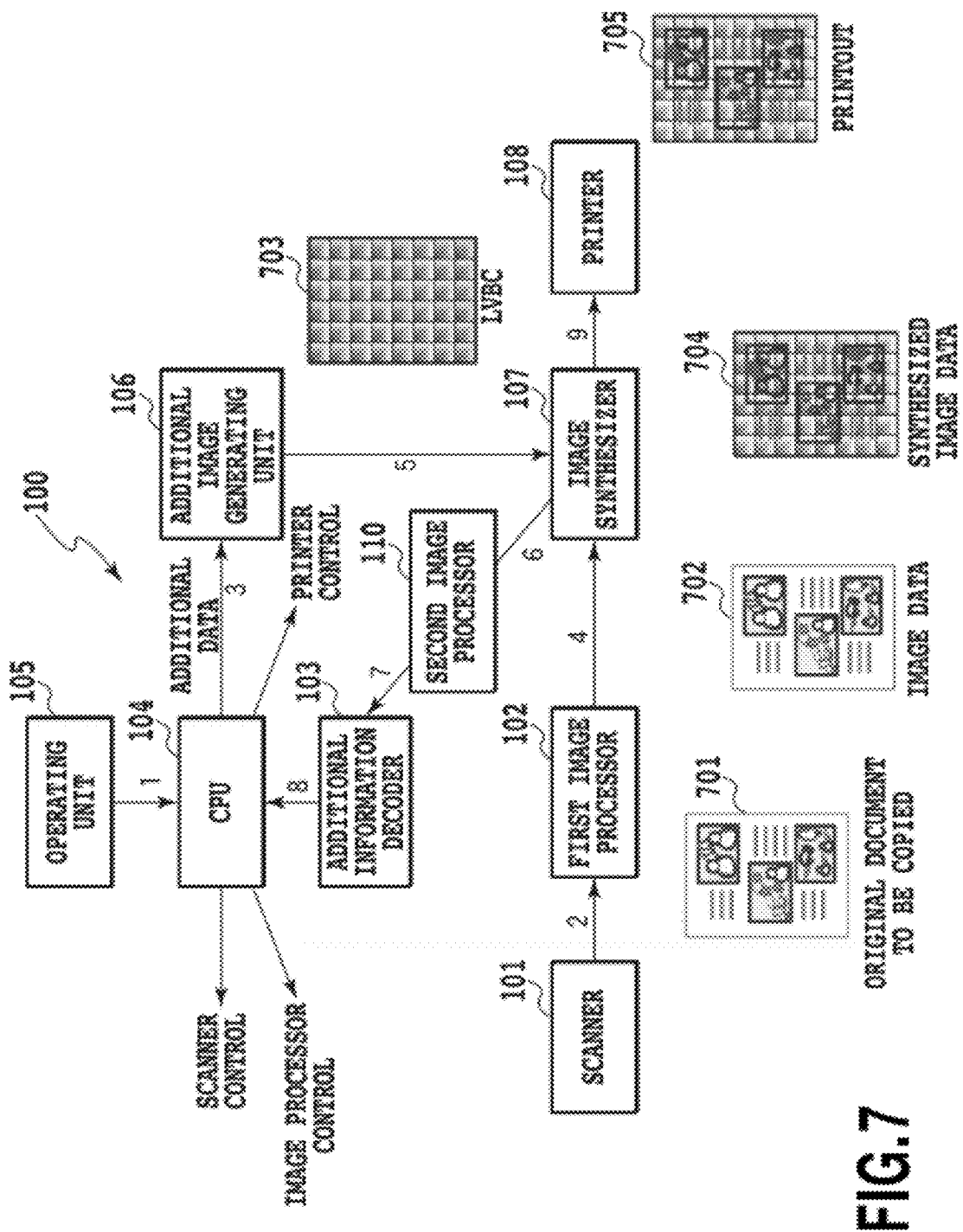
FIG. 7 is a diagram showing data flow between components of the image forming device of the second embodiment.

FIG. 7 is a diagram illustrating data flow among units of the image forming device of the second embodiment.

Processing in the case of embedding an LVBC representing predetermined additional information in an original document in which no LVBC is embedded is copied will be described below with reference to FIGS. 6 and 7.

In step S601, the operating unit 105 sets the contents of image processing performed by the first image processor 102 and additional information and outputs set contents to the CPU 104 according to instructions from a user (refer to path 1 in FIG. 7).

In step S602, the scanner 101 scans an original document in which no LVBC is embedded and outputs scanned image data to the first image processor 102 (refer to path 2 in FIG. 7).

In step S603, the first image processor 102 receives image data from the scanner 101 and performs image processing set by the operating unit 105 on the image data.

In step S604, the first image processor 102 stores image data for which image processing has been finished in a storage medium such as a memory (not shown).

Processing of steps S605 to S607 is performed in parallel with processing of steps S602 to S604.

In step S605, the CPU 104 generates additional data on the basis of additional information set by the operating unit 105 and outputs the additional data to the additional image generating unit 106 (refer to path 3 in FIG. 7).

In step S606, the CPU 104 sets the grid interval to the maximum value and sets the dot area to the minimum value for the additional image generating unit 106.

In step S607, the additional image generating unit 106 generates an LVBC on the basis of the grid interval and the dot area which have been set.

In step S608, the image synthesizer 107 synthesizes image data for which image processing has been finished stored in a memory or the like in step S604 and an LVBC generated in step S607 to each other. Subsequently, the image synthesizer 107 stores synthesized image data in a storage medium such as a memory (not shown) and outputs the synthesized image data to the second image processor 110 (refer to paths 4 to 6 in FIG. 7).

In step S609, the second image processor 110 receives the synthesized image data (image data in which an LVBC is embedded) from the image synthesizer 107 and performs image processing to simulate image deterioration at the time of printout and scanner scanning on the synthesized image data. Subsequently, the second image processor 110 outputs synthesized image data for which image processing has been finished to the additional information decoder 103 (refer to paths 6 and 7 in FIG. 7).

In steps S610 and S611, the additional information decoder 103 determines whether an LVBC embedded in synthesized image data received from the second image processor 110 is decodable or not, and proceeds to step S612 when the LVBC is decodable while proceeding to step S613 when the LVBC is undecodable. Furthermore, the additional information decoder 103 outputs the determination result to the CPU 104 (refer to path 8 in FIG. 7).

In step S611, the image synthesizer 107 outputs synthesized image data stored in a memory or the like in step S608 to the printer 108, and the printer 108 prints out the synthesized image data (refer to path 9 in FIG. 7).

In step S613, the CPU 104 determines whether a grid interval which has been set is the minimum value or not, and proceeds to step S614 when the grid interval is not the minimum value while proceeding to step S615 when the grid interval is the minimum value.

In step S614, the CPU 104 performs setting to decrease the grid interval by one level for the additional image generating unit 106 and subsequently performs the processing of steps S607 to S611. In other words, the CPU 104 decreases the grid interval by one level until it can be determined that an LVBC is decodable in step S611. When a decodable LVBC is not obtained even if the grid interval is minimized, the CPU 104 proceeds to step S615. Note that the CPU 104 may perform setting to decrease the grid interval by two or more levels at a time.

In step S615, the CPU 104 determines whether a dot area which has been set is the maximum value or not, and proceeds to step S616 when the dot area is not the maximum value while proceeding to step S617 when the dot area is the maximum value.

In step S616, the CPU 104 performs setting to increase the dot area by one level for the additional image generating unit 106. In other words, the CPU104 increases the dot area by one level until it can be determined that an LVBC is decodable in step S611. When a decodable LVBC is not obtained even if the dot area is maximized, the CPU 104 proceeds to step S617. In other words, when a decodable LVBC is not obtained even if the grid interval is minimized and the dot area is maximized, the CPU 104 determines to stop the printout and displays a message such as "It is impossible to embed decodable additional information" on the operating unit 105. Note that step S616 may be a step of performing setting to increase the dot area by two or more levels at a time.

Figure 8:
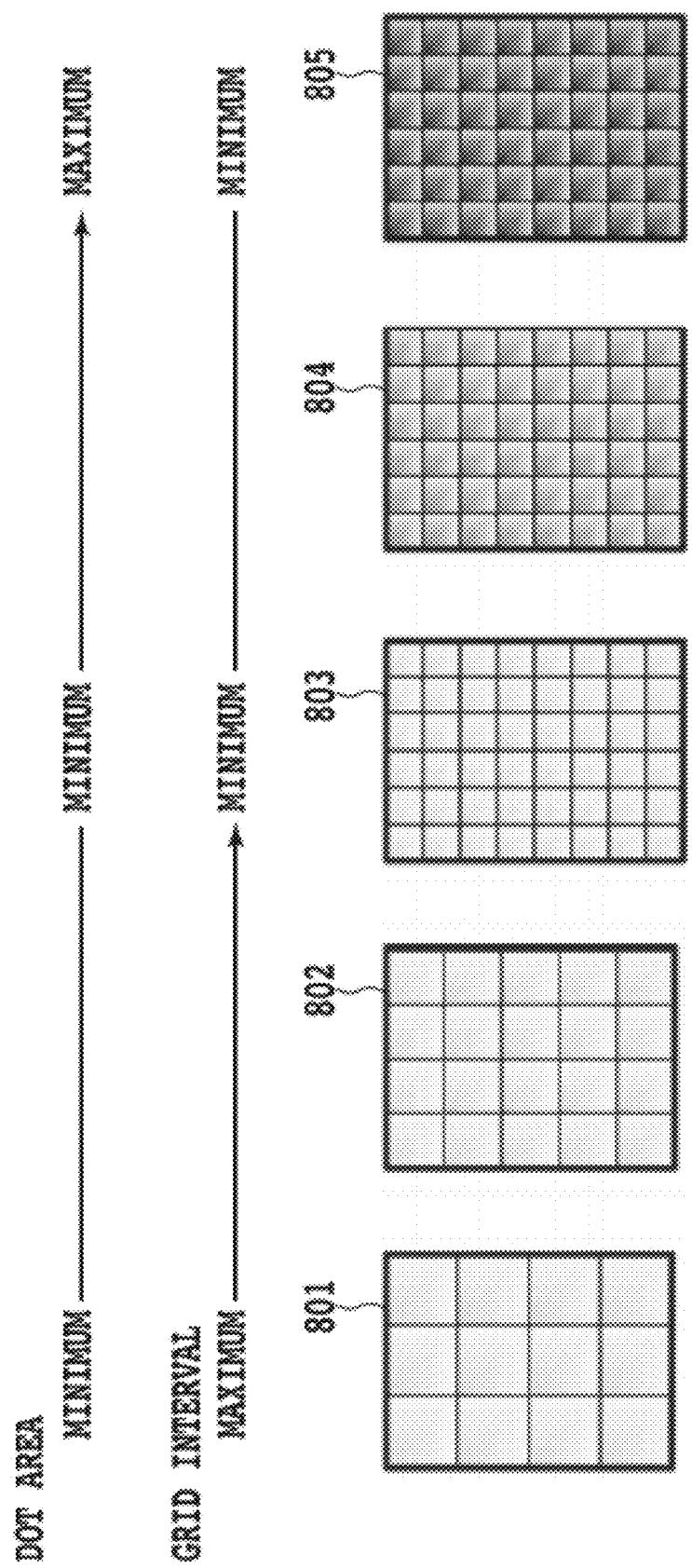
FIG. 8 is a diagram showing LVBCs of two or more patterns generated in the second embodiment.

FIG. 8 is a diagram showing LVBCs of two or more patterns generated by the above repetition processing.

In FIG. 8, the reference numerals 801 to 805 each indicates an LVBC. As shown in FIG. 8, the LBVCs of five patterns are generated in the order from 801 to 805 until it is determined that an LBVC is decodable by performing the processing of steps S607 to S616 shown in FIG. 6. The reference numeral 801 indicates an LVBC generated when the grid interval is set to the maximum value and the dot area is set to the minimum value, the LVBC 801 being visually most inconspicuous. In contrast to this, the reference numeral 805 indicates an LVBC generated when the grid interval is set to the minimum value and the dot area is set to the maximum value, the LVBC being visually most conspicuous.

As described above, the second embodiment determines first whether an LVBC is decodable or not while decreasing the grid interval step-by-step and then increases the dot area step-by-step when an LVBC can not be decoded even if the grid interval is minimized. In this way, the second embodiment determines whether an LVBC is decodable or not while adjusting the grid interval and the dot area and prints out image data in which a decodable LVBC is embedded at the time when determining that the LVBC is decodable.

As described above, the second embodiment adjusts the grid interval on a priority basis, because even if the grid interval is reduced, an LVBC which is decodable and inconspicuous can be obtained soon because of its low visibility.

Third Embodiment

The first and second embodiments determine whether or not an LVBC is decodable from synthesized image data for which image processing for simulating image deterioration at the time of printout and scanner scanning has been performed, and embed a decodable LVBC in an original document.

However, as described in the above description of the LVBC technology, when an LVBC is embedded in image data at the time of printout, or when the LVBC is decoded, it is preferable to perform error correction processing.

Thus, even if an LVBC is decodable, there is a difference in an actual printout between the case that there is no portion to be corrected by the error correction processing at all and the case that there are many portions to be corrected by the error correction processing. For example, when there is no portion to be corrected by the error correction processing at all, an LVBC can be decoded by scanning image by the scanner even if the handling of an original document after printout is bad to some extent. However, when there are many portions to be corrected, there is a case that an LVBC can not be decoded.

For this reason, the third embodiment determines whether an LVBC is decodable or not before printing out image data in which the LVBC is embedded, and makes adjustment to further increase the decidability of the LVBC according to the amount of error correction even when determining that the LVBC is decodable.

Figure 9:
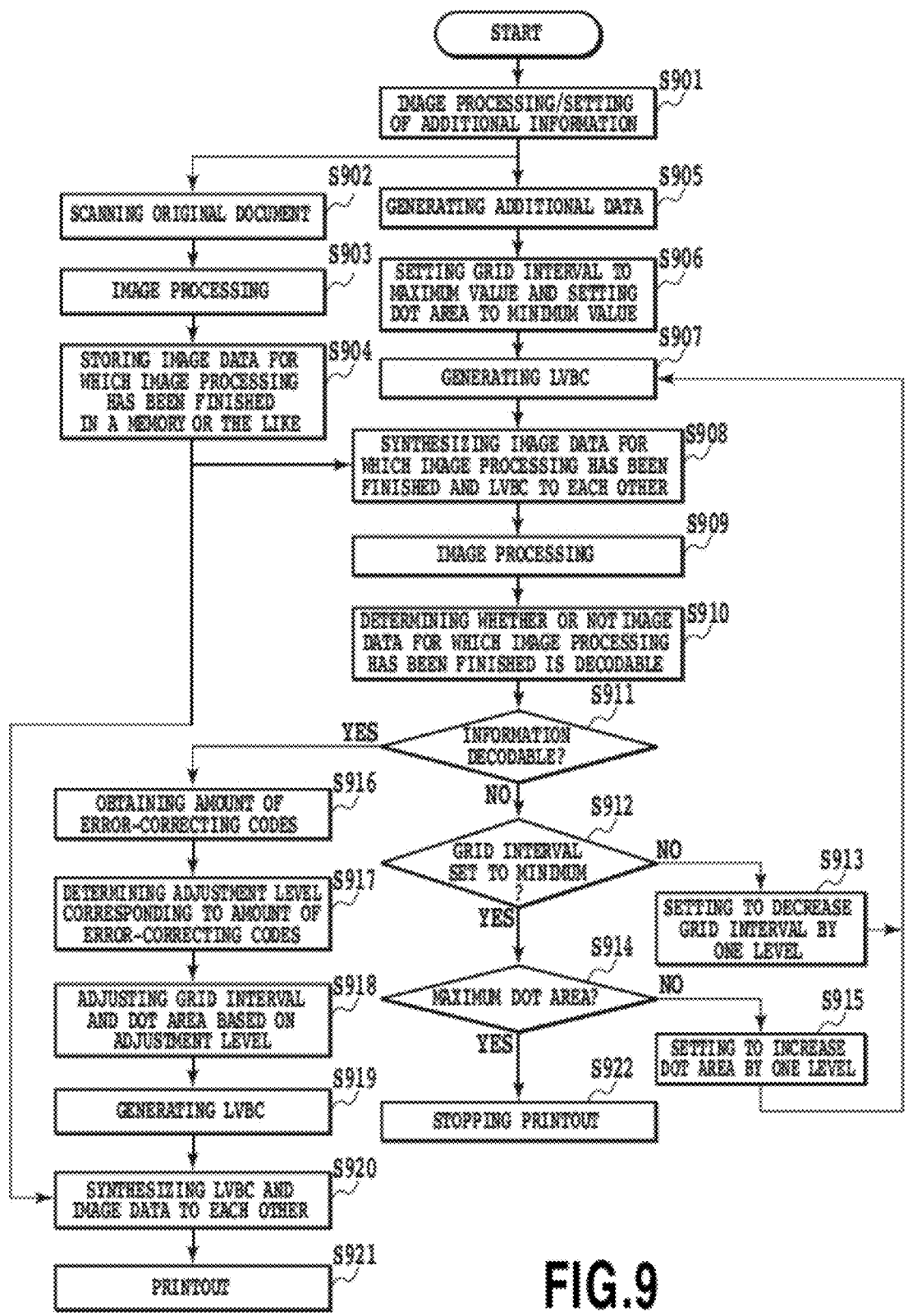
FIG. 9 is a flow chart showing the flow of processing by an image forming device of a third embodiment.

FIG. 9 is a flowchart showing the flow of processing by the image forming device of the third embodiment.

Processing in the case of embedding an LVBC representing predetermined additional information when an original document in which no LVBC is embedded is copied will be described below with reference to FIG. 9.

In step S901, the operating unit 105 sets the contents of image processing performed by the first image processor 102 and additional information and outputs set contents to the CPU 104 according to instructions from a user.

In step S902, the scanner 101 scans an original document in which no LVBC is embedded and outputs scanned image data to the first image processor 102.

In step S903, the first image processor 102 receives image data from the scanner 101 and performs image processing set by the operating unit 105 on the image data.

In step S904, the first image processor 102 stores image data for which image processing has been finished in a storage medium such as a memory (not shown).

Processing of steps S905 to S907 is performed in parallel with processing of steps S902 to S904.

In step S905, the CPU 104 generates additional data on the basis of additional information set by the operating unit 105 and outputs the additional data to the additional image generating unit 106.

In step S906, the CPU 104 sets the grid interval to the maximum value and sets the dot area to the minimum value for the additional image generating unit 106.

In step S907, the additional image generating unit 106 generates an LVBC on the basis of the grid interval and the dot area which have been set.

In step S908, the image synthesizer 107 synthesizes image data for which image processing has been finished stored in a memory or the like in step S904 and an LVBC generated in step S907 to each other. Subsequently, the image synthesizer 107 stores synthesized image data in a storage medium such as a memory (not shown) and outputs the synthesized image data to the second image processor 110.

In step S909, the second image processor 110 receives synthesized image data (image data in which an LVBC is embedded) from the image synthesizer 107 and performs image processing to simulate image deterioration at the time of printout and scanner scanning on the synthesized image data. Subsequently, the second image processor 110 outputs synthesized image data for which image processing has been finished to the additional information decoder 103.

In steps S910 and S911, the additional information decoder 103 determines whether or not an LVBC embedded in the synthesized image data received from the second image processor 110 is decodable. The additional information decoder 103 proceeds to step S916 when the LVBC is decodable while proceeding to step S912 when the LVBC is undecodable.

Furthermore, the additional information decoder 103 outputs the determination result to the CPU 104.

In step S912, the CPU 104 determines whether or not a grid interval which has been set is the minimum value, and proceeds to step S913 when the grid interval is not the minimum value while proceeding to step S914 when the grid interval is the minimum value.

In step S913, the CPU 104 performs setting to decrease the grid interval by one level for the additional image generating unit 106 and subsequently performs the processing of steps S907 to S911. In other words, the CPU 104 decreases the grid interval by one level until it can be determined that an LVBC is decodable in step S911. When a decodable LVBC is not obtained even if the grid interval is minimized, the CPU 104 proceeds to step S914. Note that the CPU 104 may perform setting to decrease the grid interval by two or more levels at a time.

In step S914, the CPU 104 determines whether or not a dot area which has been set is the maximum value, and proceeds to step S915 when the dot area is not the maximum value while proceeding to step S922 when the dot area is the maximum value.

In step S915, the CPU 104 performs setting to increase the dot area by one level for the additional image generating unit 106. In other words, the CPU 104 increases the dot area by one level until it can be determined that an LVBC is decodable in step S911. When a decodable LVBC is not obtained even if the dot area is maximized, the CPU 104 proceeds to step S914. In other words, when a decodable LVBC is not obtained even if the grid interval is minimized and the dot area is maximized, the CPU 104 determines to stop the printout and displays a message such as "It is impossible to embed decodable additional information" on the operating unit 105. Note that step S915 may be a step of performing setting to increase the dot area by two or more levels at a time.

FIG. 8 is a diagram showing an example of an LVBC generated by the above repetition processing, and the contents of it are omitted because they have been already described.

The third embodiment is characterized in the processing of step S916 and later steps after it has been determined that an LVBC is decodable in step S911.

In step S916, the additional information decoder 103 obtains how many bits of additional information data have been corrected (amount of error correcting codes) and stores it in a storage medium such as a memory.

In step S917, the CPU 104 determines an adjustment level according to the amount of error correcting codes.

Figure 10:
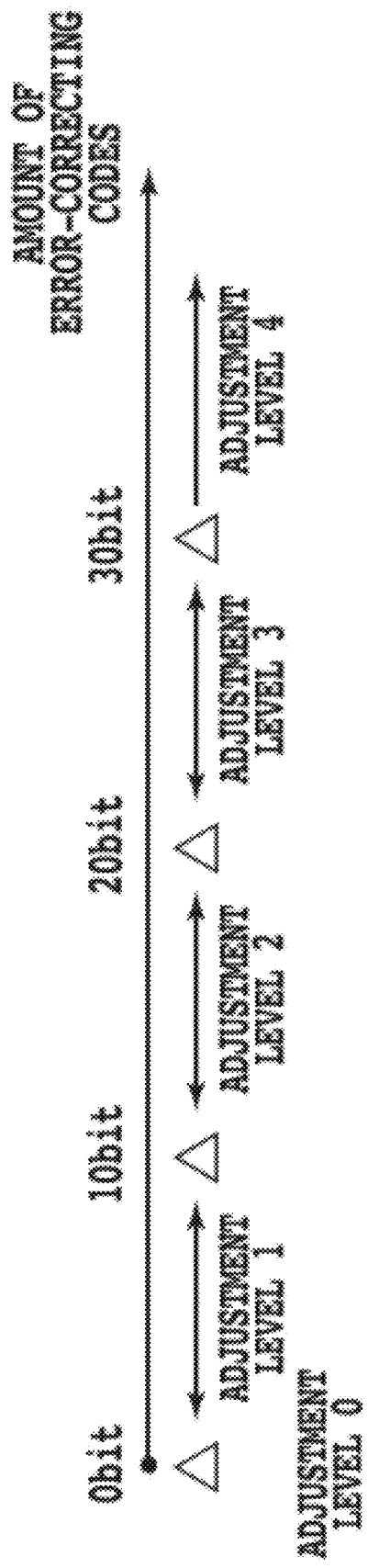
FIG. 10 is a diagram illustrating a method of determining an adjustment level according to the amount of error-correcting codes in the third embodiment.

FIG. 10 is a diagram illustrating a method of determining an adjustment level according to the amount of error correcting codes.

In this example, it is assumed that the grid interval is 2 mm, the dot area is 2 $\mu m^2$, the number of bits of additional information is 1024, and five adjustment levels are provided. In adjustment level 0, the number of bits corrected by error correction processing (amount of error correcting codes) of 1024 bits is 0. In adjustment level 1, the amount of error correcting codes is between 1 and 10. In adjustment level 2, the amount of error correcting codes is between 11 and 20. In adjustment level 3, the amount of error correcting codes is between 21 and 30. In adjustment level 4, the amount of error correcting codes is 30 or more.

In the third embodiment, a grid interval and a dot area are adjusted in accordance with the adjustment levels.

In step S918, a grid interval and a dot area are adjusted as follows on the basis of an adjustment level. For example, when the adjustment level is 0, the dot area and the grid interval are not changed. When the adjustment level is 1, the dot area is unchanged and the grid interval is decreased by one level. When the adjustment level is 2, the dot area is unchanged and the grid interval is decreased by two levels. When the adjustment level is 3, the dot area is increased by one level and the grid interval is decreased by one level. When the adjustment level is 4, the dot area is increased by two levels and the grid interval is decreased by two levels.

FIG. 11 is a diagram illustrating an example of adjustment of a grid interval and a dot area based on adjustment levels.

In the example shown in FIG. 11, it is assumed that an LVBC having the grid interval of 2 mm and the dot area of 2 $\mu m^2$ is decodable. When an adjustment level at the time when the grid interval is 2 mm and the dot area is 2 $\mu m^2$ is 0, the grid interval and the dot area are unchanged. When the adjustment level is 1, the dot area is unchanged and the grid interval is decreased by one level. In other words, the grid interval is changed to 1 mm. When the adjustment level is 2, the dot area is unchanged and the grid interval is decreased by two levels. In other words, the grid interval is changed to 0.5 mm. When the adjustment level is 3, the dot area is increased by one level and the grid interval is decreased by one level. In other words, the grid interval is changed to 1 mm and the dot area is changed to 4 $\mu m^2$. When the adjustment level is 4, the dot area is increased by two levels and the grid interval is decreased by two levels. In other words, the grid interval is changed to 0.5 mm and the dot area is changed to 4 $\mu m^2$.

FIG. 12 is a diagram illustrating another example of adjustment of a grid interval and a dot area based on adjustment levels.

In this example, it is assumed that an LVBC having the grid interval of 1 mm and the dot area of 2 $\mu m^2$ is decodable. According to this example, when an adjustment level at the time when the grid interval is 1 mm and the dot area is 2 $\mu m^2$ is 0, the grid interval and the dot area are unchanged. When the adjustment level is 1, the dot area is unchanged and the grid interval is decreased by one level. In other words, the grid interval is changed to 0.5 mm. When the adjustment level is 2, originally the dot area is unchanged and the grid interval is decreased by two levels. However, the setting limit of the grid interval is 0.5 mm, so that the grid interval can not be decreased by two levels. For this reason, the decodability is increased by changing the grid interval to 0.5 mm and increasing the dot area by one level to be 4 $\mu m^2$.

When the adjustment level is 3, originally the dot area is increased by one level and the grid interval is decreased by one level in order that the grid interval is changed to 0.5 mm and the dot area is changed to 4 $\mu m^2$. However, as described above, this setting is made when the adjustment level is 2. Thus, the decidability is increased by changing the grid interval to 0.5 mm and increasing the dot area by two levels to be 6 $\mu m^2$.

When the adjustment level is 4, originally the dot area is increased by two levels and the grid interval is decreased by two levels. However, the setting limit of the grid interval is 0.5 mm, so that the grid interval can not be decreased by two levels. For this reason, the grid interval is changed to 0.5 mm. In order to increase the decodability, it is necessary to enlarge the dot area more than 6 $\mu m^2$. However, the setting limit of the dot area is 6 $\mu m^2$, so that the dot area can not be enlarged more than 6 $\mu m^2$. Thus, when the adjustment level is 4, the grid interval is changed to 0.5 mm and the dot area is changed to 6 $\mu M^2$ as in the case that the adjustment level is 3

In this way, when it is necessary to adjust the grid interval and the dot area exceeding the setting limits, a message drawing attention such as "There is a possibility that additional information can not be decoded depending on the handling of an output sheet" is displayed on the operating unit 1505.

Other Embodiments

The object of the present invention is achieved by a computer (or a CPU or an MPU) of a system or device reading a program code realizing the procedures of the flow charts shown in the above embodiments from a recording medium in which the program code is recorded and executing the program codes. The recording medium is a computer-readable recording medium. In this case, a program code it self read from a computer-readable recording medium realizes the functions of the above embodiments. For this reason, the program code and the recording medium in which the program code is recoded also constitute one of the present inventions.

As a recording medium for providing a program code, for example, a floppy (a registered trademark) disk, a hard disk, an optical disk, a magneto-optical disk, a CD-ROM, a CD-R, a magnetic tape, a nonvolatile memory card, or a ROM may be used.

It is also included in the present invention that an operating system (OS) or the like running on a computer on the basis of the instruction of the program code performs part or all of actual processing by which the functions of the above embodiments are realized.

In addition, a program code read from a recoding medium is written in a memory provided in a function extending board inserted in a computer or a function extending unit connected with a computer. After that, based on the instruction of the program code, a CPU or the like provided in the function extending board or the function extending unit performs part or all of actual processing by which the functions of the above embodiments are realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-193739, filed Jul. 25, 2007, which is hereby incorporated by reference herein in its entirety.

What is claimed is:

1. An apparatus for representing two-dimensional code information with an arrangement of dots, wherein one dot is associated with one virtual point, the apparatus comprising:
 a setting component configured to set, individually, (i) an interval between a virtual point and a virtual point adjacent to the virtual point and (ii) a size of a dot.

2. The apparatus of claim 1, wherein the setting component is capable of changing a setting of the interval without changing a setting of the size of a dot.

3. The apparatus of claim 1, wherein the setting component is capable of changing a setting of the size of a dot without changing a setting of the interval.

4. The apparatus of claim 1, wherein the virtual point is an intersection of grid lines.

5. A method for representing two-dimensional code information with an arrangement of dots, wherein one dot is associated with one virtual point, the method comprising:
 a setting step of setting, individually, (i) an interval between a virtual point and a virtual point adjacent to the virtual point and (ii) a size of a dot.

6. The method of claim 5, wherein the setting step is capable of changing a setting of the interval without changing a setting of the size of a dot.

7. The method of claim 5, wherein the setting step is capable of changing a setting of the size of a dot without changing a setting of the interval.

8. The method of claim 5, wherein the virtual point is an intersection of grid lines.

9. A program on a non-transitory computer-readable storage medium, the program causing a computer to execute the method of claim 5.

* * * * *